US012786787B2

(12) United States Patent
Sen et al.

(10) Patent No.: US 12,786,787 B2
(45) Date of Patent: Nov. 3, 2026

(54) JOINT LOW-DENSITY PARITY-CHECK CODING AND MODULATION DESIGNS

(71) Applicant: QUALCOMM Incorporated, San Diego, CA (US)

(72) Inventors: Pinar Sen, San Diego, CA (US); Wei Yang, San Diego, CA (US); Jing Jiang, San Diego, CA (US); Gabi Sarkis, San Diego, CA (US); Thomas Joseph Richardson, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 537 days.

(21) Appl. No.: 18/328,590

(22) Filed: Jun. 2, 2023

(65) Prior Publication Data

US 2024/0406797 A1 Dec. 5, 2024

(51) Int. Cl.
*H04W 28/04* (2009.01)
*H04L 1/00* (2006.01)

(52) U.S. Cl.
CPC ........... *H04W 28/04* (2013.01); *H04L 1/0061* (2013.01)

(58) Field of Classification Search
CPC .... H04W 28/04; H04L 1/0061; H04L 1/0042; H04L 1/0058; H03M 13/1102; H03M 13/255
See application file for complete search history.

(56) References Cited

U.S. PATENT DOCUMENTS

2005/0152408 A1* 7/2005 Jeong .................. H03M 13/356 370/529
2008/0294969 A1* 11/2008 Divsalar ............... H04L 1/0057 714/801
2016/0308557 A1* 10/2016 Raimondi ........... H03M 13/356
(Continued)

FOREIGN PATENT DOCUMENTS

WO WO-2019038698 A1 * 2/2019 .......... H03M 13/116

OTHER PUBLICATIONS

T. Richardson et al., "Design of Low-Density Parity Check Codes for 5G New Radio", IEEE Communications Magazine, 56(3), 28-34, Mar. 2018 (Year: 2018).*
(Continued)

*Primary Examiner* — David Zhijun Sun
(74) *Attorney, Agent, or Firm* — Holland & Hart LLP

(57) ABSTRACT

Methods, systems, and devices for wireless communications are described herein. A transmitting device (e.g., a user equipment (UE), a network entity) may generate a low-density parity-check code according to a base graph, which may be defined by variable nodes and check nodes. The base graph may support second degree variable nodes in the information nodes of the base graph and a larger quantity of second degree nodes associated with higher significance bits than with lower significance bits. Higher significance levels (e.g., bits) may correspond to higher channel reliabilities. The base graph may be a universal base graph or may include additional rules specific to probabilistic shaping. In some examples, an interleaver may be defined to map the
(Continued)

base graph to symbols. In some cases, the UE may report its capability to support one or more interleavers, or the network entity may configure the UE with an interleaver.

22 Claims, 18 Drawing Sheets

(56) References Cited

U.S. PATENT DOCUMENTS

| | | | | |
|---|---|---|---|---|
| 2019/0013900 | A1* | 1/2019 | Patel | H04L 1/0041 |
| 2023/0396392 | A1* | 12/2023 | Yan | H04L 1/0009 |

OTHER PUBLICATIONS

F. Steiner et al., “Design of robust, protograph based LDPC codes for Rate-Adaptation via probabilistic shaping.”, Proceedings of 2016 9th International Symposium on Turbo Codes and Iterative Information Processing (ISTC), 2016. (Year: 2016).*

* cited by examiner

JOINT LOW-DENSITY PARITY-CHECK CODING AND MODULATION DESIGNS

FIELD OF TECHNOLOGY

The following relates to wireless communications, including joint low-density parity-check coding and modulation designs.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support joint low-density parity-check (LDPC) coding and modulation designs. For example, a transmitting device may generate a LDPC code according to a base graph, which may be defined by variable nodes (e.g., columns of the base graph) and check nodes (e.g., rows of the base graph). The base graph design may support second degree variable nodes (e.g., variable nodes that correspond to two non-zero check nodes) in the information nodes of the base graph. Further, the base graph design may include more degree two nodes associated with higher significant bits than with lower significant bits (e.g., more degree two nodes associated with most significant bits (MSBs) or second most significant bits than with third significant bits or least significant bits (LSBs), among other examples). Each significance level may be associated with a channel reliability, with higher significance levels corresponding to higher channel reliability. In some cases, the base graph may be a universal base graph applicable to uniform shaping or probabilistic shaping. In some other cases, different base graph designs or alternative rules for the base graph design may apply specifically to uniform shaping and probabilistic shaping, respectively. For example, in a probabilistic shaping scenario, the parity bits of the base graph may be mapped to the MSB, but the next most significant bits may be mapped to the remaining degree two nodes (e.g., more degree two nodes mapped to the second most significant bits than to the third most significant bits). An interleaver may also be defined to map the lifted base graph to symbols. The network entity may indicate an interleaver to be used by the transmitting device. In some cases, the UE may report its capability to support one or more interleavers, based on which the network entity may configure the UE with an interleaver.

A method for wireless communications at a transmitting device is described. The method may include generating a LDPC code according to a base graph including a set of multiple variable nodes and a set of multiple check nodes, where a first set of information nodes of the set of multiple variable nodes include second degree nodes corresponding to two check nodes of the set of multiple check nodes, encoding a set of multiple information nodes and a set of multiple parity nodes according to the base graph, where a first quantity of the first set of information nodes corresponds to a first significance level of a set of multiple significance levels, and a second quantity of the first set of information nodes different than the first quantity corresponds to a second significance level of the set of multiple significance levels, and transmitting a signal including a set of multiple information bits and a set of multiple parity bits based on the encoding the set of multiple information nodes and the set of multiple parity nodes.

An apparatus for wireless communications at a transmitting device is described. The apparatus may include at least one processor, at least one memory coupled with the at least one processor, and instructions stored in the at least one memory. The instructions may be executable by the at least one processor, individually or in any combination, to cause the apparatus to generate a LDPC code according to a base graph including a set of multiple variable nodes and a set of multiple check nodes, where a first set of information nodes of the set of multiple variable nodes include second degree nodes corresponding to two check nodes of the set of multiple check nodes, encode a set of multiple information nodes and a set of multiple parity nodes according to the base graph, where a first quantity of the first set of information nodes corresponds to a first significance level of a set of multiple significance levels, and a second quantity of the first set of information nodes different than the first quantity corresponds to a second significance level of the set of multiple significance levels, and transmit a signal including a set of multiple information bits and a set of multiple parity bits based on the encoding the set of multiple information nodes and the set of multiple parity nodes.

Another apparatus for wireless communications at a transmitting device is described. The apparatus may include means for generating a LDPC code according to a base graph including a set of multiple variable nodes and a set of multiple check nodes, where a first set of information nodes of the set of multiple variable nodes include second degree nodes corresponding to two check nodes of the set of multiple check nodes, means for encoding a set of multiple information nodes and a set of multiple parity nodes according to the base graph, where a first quantity of the first set of information nodes corresponds to a first significance level of a set of multiple significance levels, and a second quantity of the first set of information nodes different than the first quantity corresponds to a second significance level of the set of multiple significance levels, and means for transmitting a signal including a set of multiple information bits and a set of multiple parity bits based on the encoding the set of multiple information nodes and the set of multiple parity nodes.

A non-transitory computer-readable medium storing code for wireless communications at a transmitting device is described. The code may include instructions executable by a processor to generate a LDPC code according to a base graph including a set of multiple variable nodes and a set of multiple check nodes, where a first set of information nodes of the set of multiple variable nodes include second degree nodes corresponding to two check nodes of the set of multiple check nodes, encode a set of multiple information nodes and a set of multiple parity nodes according to the base graph, where a first quantity of the first set of information nodes corresponds to a first significance level of a set of multiple significance levels, and a second quantity of the first set of information nodes different than the first quantity corresponds to a second significance level of the set of multiple significance levels, and transmit a signal including a set of multiple information bits and a set of multiple parity bits based on the encoding the set of multiple information nodes and the set of multiple parity nodes.

In some examples of the method, apparatuses, and non-transitory computer-readable medium described herein, the set of multiple parity nodes of the base graph include second degree nodes corresponding to two check nodes of the set of multiple check nodes, the set of multiple parity nodes corresponding to a third significance level of the set of multiple significance levels that may be higher than the first significance level and the second significance level.

In some examples of the method, apparatuses, and non-transitory computer-readable medium described herein, each significance level of the set of multiple significance levels corresponds to a respective channel reliability, where a higher significance level corresponds to a higher channel reliability.

In some examples of the method, apparatuses, and non-transitory computer-readable medium described herein, the first quantity of the first set of information nodes may be greater than the second quantity of the first set of information nodes, and where the first significance level may be greater than the second significance level.

Some examples of the method, apparatuses, and non-transitory computer-readable medium described herein may further include operations, features, means, or instructions for mapping the set of multiple information nodes to a set of multiple bits according to an interleaver indicating an inverse relationship between a degree and a significance level of each respective information node of the set of multiple information nodes.

Some examples of the method, apparatuses, and non-transitory computer-readable medium described herein may further include operations, features, means, or instructions for mapping the set of multiple information nodes to a set of multiple bits according to an interleaver and based on the base graph, where for each information node of the set of multiple information nodes, a numerical value representing a degree of the information node may be less than or equal to a respective numerical value representing a significance level corresponding to each information node.

In some examples of the method, apparatuses, and non-transitory computer-readable medium described herein, the set of multiple parity nodes of the base graph include second degree nodes corresponding to two check nodes of the set of multiple check nodes, the set of multiple parity nodes corresponding to a third significance level of the set of multiple significance levels that may be higher than the first significance level and the second significance level.

Some examples of the method, apparatuses, and non-transitory computer-readable medium described herein may further include operations, features, means, or instructions for selecting a uniform modulation constellation or a probabilistic shaping modulation constellation, where the base graph and generating the LDPC code may be based on the selecting.

In some examples of the method, apparatuses, and non-transitory computer-readable medium described herein, the base graph includes a universal base graph applicable to any constellation of a set of multiple constellations including a uniform modulation constellation and a probabilistic shaping modulation constellation.

In some examples of the method, apparatuses, and non-transitory computer-readable medium described herein, a second set of information nodes of the set of multiple variable nodes corresponding to a third significance level of the set of multiple significance levels that may be lower than the first significance level and the second significance level include third degree nodes corresponding to three check nodes of the set of multiple check nodes.

Some examples of the method, apparatuses, and non-transitory computer-readable medium described herein may further include operations, features, means, or instructions for receiving control signaling indicating a modulation order, where generating the base graph may be based on the modulation order satisfying a modulation order threshold.

Some examples of the method, apparatuses, and non-transitory computer-readable medium described herein may further include operations, features, means, or instructions for receiving control signaling indicating an interleaver for bit-to-constellation mapping of the set of multiple information nodes according to the base graph, where generating the LDPC code may be based on the control signaling indicating the interleaver.

Some examples of the method, apparatuses, and non-transitory computer-readable medium described herein may further include operations, features, means, or instructions for receiving an indication of the interleaver via downlink control information, a medium access control-control element, radio resource control signaling, or any combination thereof.

Some examples of the method, apparatuses, and non-transitory computer-readable medium described herein may further include operations, features, means, or instructions for selecting an interleaver for bit-to-constellation mapping of the set of multiple information nodes according to the base graph based on an error floor, a threshold sensitivity level, a modulation order, a capability of the transmitting device, a capability of a receiving device, or any combination thereof, where generating the LDPC code may be based on the selecting.

Some examples of the method, apparatuses, and non-transitory computer-readable medium described herein may further include operations, features, means, or instructions for transmitting an indication of one or more interleavers for bit-to-constellation mapping of the set of multiple information nodes supported by the transmitting device, where generating the LDPC code may be based on transmitting the indication of the one or more interleavers.

A method for wireless communications at a receiving device is described. The method may include receiving a signal including a set of multiple information bits and a set of multiple parity bits corresponding to a LDPC code, generating the LDPC code according to a base graph including a set of multiple variable nodes and a set of multiple check nodes, where a first set of information nodes of the set of multiple variable nodes include second degree nodes corresponding to two check nodes of the set of multiple check nodes, and decoding the set of multiple information bits based on the set of multiple parity bits, a set of multiple information nodes, and a set of multiple parity nodes, the set of multiple information nodes and the set of multiple parity nodes corresponding to the base graph, where the first set of information nodes of the set of multiple variable nodes include second degree nodes corresponding to two check nodes of the set of multiple check nodes; and where a first quantity of the first set of information nodes corresponds to a first significance level of a set of multiple significance levels, and a second quantity of the first set of information nodes different than the first quantity corresponds to a second significance level of the set of multiple significance levels.

An apparatus for wireless communications at a receiving device is described. The apparatus may include at least one processor, at least one memory coupled with the at least one processor, and instructions stored in the at least one memory. The instructions may be executable by the at least one processor, individually or in any combination, to cause the apparatus to receive a signal including a set of multiple information bits and a set of multiple parity bits corresponding to a LDPC code, generate the LDPC code according to a base graph including a set of multiple variable nodes and a set of multiple check nodes, where a first set of information nodes of the set of multiple variable nodes include second degree nodes corresponding to two check nodes of the set of multiple check nodes, and decode the set of multiple information bits based on the set of multiple parity bits, a set of multiple information nodes, and a set of multiple parity nodes, the set of multiple information nodes and the set of multiple parity nodes corresponding to the base graph, where the first set of information nodes of the set of multiple variable nodes include second degree nodes corresponding to two check nodes of the set of multiple check nodes; and where a first quantity of the first set of information nodes corresponds to a first significance level of a set of multiple significance levels, and a second quantity of the first set of information nodes different than the first quantity corresponds to a second significance level of the set of multiple significance levels.

Another apparatus for wireless communications at a receiving device is described. The apparatus may include means for receiving a signal including a set of multiple information bits and a set of multiple parity bits corresponding to a LDPC code, means for generating the LDPC code according to a base graph including a set of multiple variable nodes and a set of multiple check nodes, where a first set of information nodes of the set of multiple variable nodes include second degree nodes corresponding to two check nodes of the set of multiple check nodes, and means for decoding the set of multiple information bits based on the set of multiple parity bits, a set of multiple information nodes, and a set of multiple parity nodes, the set of multiple information nodes and the set of multiple parity nodes corresponding to the base graph, where the first set of information nodes of the set of multiple variable nodes include second degree nodes corresponding to two check nodes of the set of multiple check nodes; and where a first quantity of the first set of information nodes corresponds to a first significance level of a set of multiple significance levels, and a second quantity of the first set of information nodes different than the first quantity corresponds to a second significance level of the set of multiple significance levels.

A non-transitory computer-readable medium storing code for wireless communications at a receiving device is described. The code may include instructions executable by a processor to receive a signal including a set of multiple information bits and a set of multiple parity bits corresponding to a LDPC code, generate the LDPC code according to a base graph including a set of multiple variable nodes and a set of multiple check nodes, where a first set of information nodes of the set of multiple variable nodes include second degree nodes corresponding to two check nodes of the set of multiple check nodes, and decode the set of multiple information bits based on the set of multiple parity bits, a set of multiple information nodes, and a set of multiple parity nodes, the set of multiple information nodes and the set of multiple parity nodes corresponding to the base graph, where the first set of information nodes of the set of multiple variable nodes include second degree nodes corresponding to two check nodes of the set of multiple check nodes; and where a first quantity of the first set of information nodes corresponds to a first significance level of a set of multiple significance levels, and a second quantity of the first set of information nodes different than the first quantity corresponds to a second significance level of the set of multiple significance levels.

In some examples of the method, apparatuses, and non-transitory computer-readable medium described herein, the set of multiple parity nodes of the base graph include second degree nodes corresponding to two check nodes of the set of multiple check nodes, the set of multiple parity nodes corresponding to a third significance level of the set of multiple significance levels that may be higher than the first significance level and the second significance level.

In some examples of the method, apparatuses, and non-transitory computer-readable medium described herein, the first quantity of the first set of information nodes may be greater than the second quantity of the first set of information nodes, and where the first significance level may be greater than the second significance level.

In some examples of the method, apparatuses, and non-transitory computer-readable medium described herein, each significance level of the set of multiple significance levels corresponds to a respective channel reliability, where a higher significance level corresponds to a higher channel reliability.

In some examples of the method, apparatuses, and non-transitory computer-readable medium described herein, a second set of information nodes of the set of multiple variable nodes corresponding to a third significance level of the set of multiple significance level that may be lower than the first significance level and the second significance level include third degree nodes corresponding to three check nodes of the set of multiple check nodes.

Some examples of the method, apparatuses, and non-transitory computer-readable medium described herein may further include operations, features, means, or instructions for transmitting control signaling indicating a modulation order, where generating the base graph may be based on the modulation order satisfying a modulation order threshold.

Some examples of the method, apparatuses, and non-transitory computer-readable medium described herein may further include operations, features, means, or instructions for transmitting control signaling indicating an interleaver for bit-to-constellation mapping of the set of multiple information nodes according to the base graph, where generating the LDPC code may be based on the control signaling indicating the interleaver.

Some examples of the method, apparatuses, and non-transitory computer-readable medium described herein may further include operations, features, means, or instructions for transmitting an indication of the interleaver via downlink control information, a medium access control-control element, radio resource control signaling, or any combination thereof.

Some examples of the method, apparatuses, and non-transitory computer-readable medium described herein may further include operations, features, means, or instructions for receiving an indication of one or more interleavers for bit-to-constellation mapping of the set of multiple information nodes supported by a transmitting device, where generating the LDPC code may be based on receiving the indication of the one or more interleavers.

DETAILED DESCRIPTION

Figure 1:
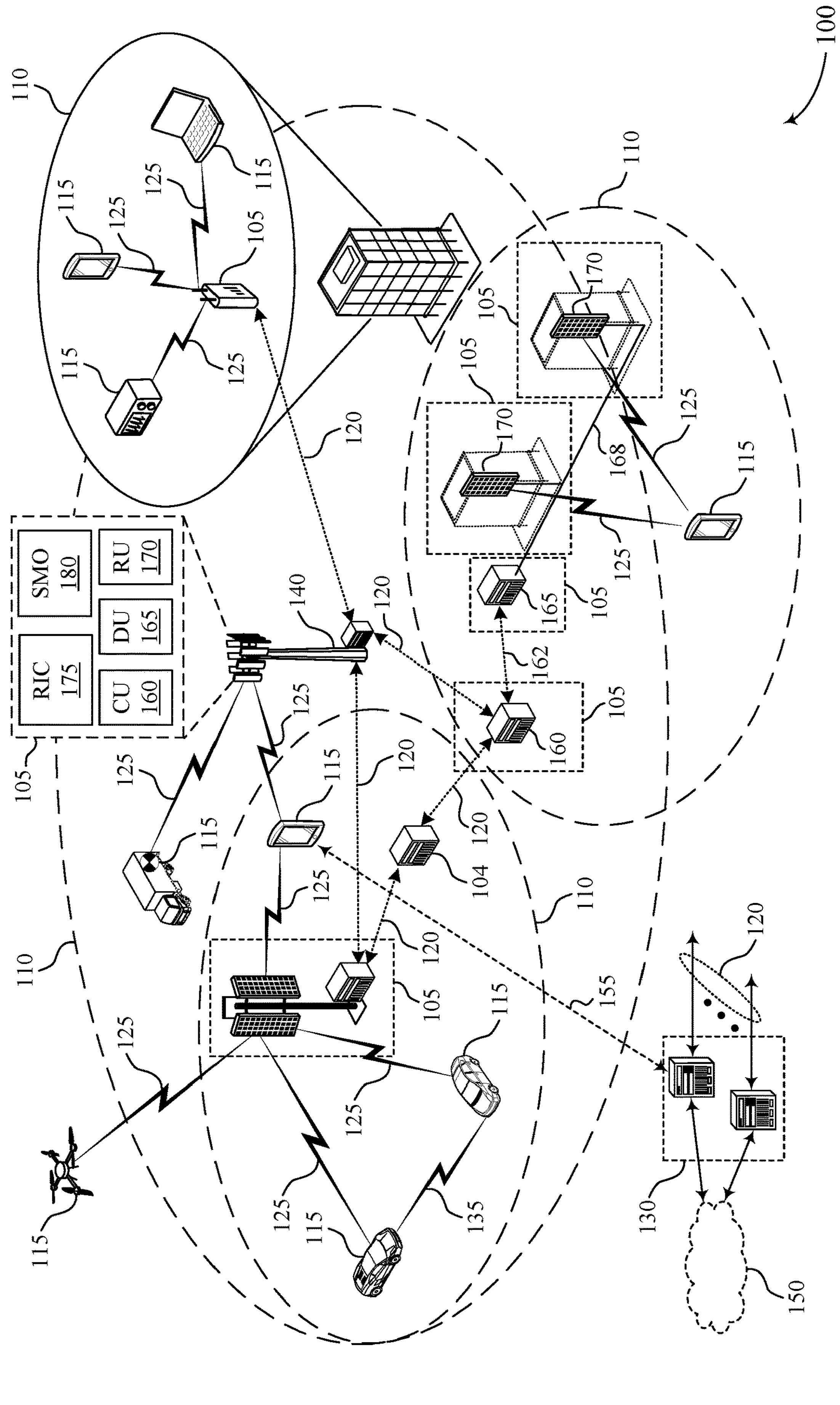
FIG. 1 shows an example of a wireless communications system that supports joint low-density parity-check (LDPC) coding and modulation designs in accordance with one or more aspects of the present disclosure.

Some wireless communications systems may implement error correcting codes to transmit signals over noisy communications channels, such as low-density parity-check (LDPC) codes. LDPC codes may be defined by a base graph and a lifting operation performed on the base graph using a circulant identity matrix to create a quantity of copies of the base graph. The base graph may be defined by variable nodes (e.g., columns) and check nodes (rows). Devices within the wireless communications systems may implement modulation operations, such as lower-order modulation operations (quadrature phase-shift keying (QPSK) modulation) and higher-order modulation operations (e.g., quadrature amplitude modulation (QAM) modulation) to map the multiple information bits to a modulation constellation. In some examples, bit-to-symbol mapping may be associated with an interleaver. Devices within the wireless communications system may further implement shaping (e.g., probabilistic shaping) to convert a uniform modulation constellation into a non-uniform modulation constellation. However, some examples of a base graph may not be compatible with higher-order modulation operations because generating a large quantity of complex copies of the base graph may generate a significant increase in overhead to support high throughput of higher modulation orders. Further, some interleavers may be associated with poor error floor performance. Poor error floor performance, a base graph that does not support higher throughput for higher order modulation schemes, or both, may result in decreased reliability of wireless communications, decreased throughput, increased latency, and decreased user experience.

Various aspects of the present disclosure are related to joint LDPC coding and modulation designs. A transmitting device may generate a LDPC code according to a base graph, which may be defined by variable nodes and check nodes. The base graph design may support second degree variable nodes (e.g., variable nodes that correspond to two non-zero check nodes) in the information nodes (e.g., core) of the base graph. Further, the base graph design may include more degree two nodes associated with higher significance bits than with lower significance bits (e.g., more degree two nodes associated with most significant bits (MSBs) or second most significant bits than with third significant bits or least significant bits (LSBs), among other examples). Each significance level may be associated with a channel reliability, with higher significance levels corresponding to higher channel reliability. Variable nodes mapping to the LSB may be required to be of degree three or higher. In some cases, the base graph may be a universal base graph applicable to uniform shaping or probabilistic shaping. In some other cases, different base graph designs or alternative rules for the base graph design may apply specifically to uniform shaping or probabilistic shaping, respectively. For example, with respect to probabilistic shaping, the parity bits of the base graph may be mapped to the MSB, but the next most significant bits may be mapped to the degree two nodes (e.g., more degree two nodes mapped to the second most significant bits than to the third most significant bits). An interleaver may also be defined to map the lifted base graph to symbols. The network entity may indicate an interleaver to be used by the transmitting device. In some cases, the UE may report its capability to support one or more interleavers, based on which the network entity may configure the UE with an interleaver.

Aspects of the disclosure are initially described in the context of wireless communications systems. Aspects of the disclosure are additionally illustrated with reference to signaling diagrams, base graph designs, interleaver designs, and process flows. Aspects of the disclosure are further illustrated by and described with reference to apparatus diagrams, system diagrams, and flowcharts that relate to joint LDPC coding and modulation designs.

FIG. 1 shows an example of a wireless communications system 100 that supports joint LDPC coding and modulation designs in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c. F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support joint LDPC coding and modulation designs as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHZ, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

A transmitting device (e.g., a network entity 105, a UE 115) may generate a LDPC code according to a base graph, which may be defined by variable nodes and check nodes. The base graph design may support second degree variable nodes (e.g., variable nodes that correspond to two non-zero check nodes) in the information portion (e.g., core) of the base graph. Further, the base graph design may include more degree two nodes associated with higher significant bits than with lower significant bits (e.g., more degree two nodes associated with MSBs or second MSBs than with third MSBs or LSBs. Each significance level may be associated with a channel reliability, with higher significance levels corresponding to higher channel reliabilities. Variable nodes mapping to the LSB may be required to be of degree three or higher. In some cases, the base graph may be a universal base graph. In some other cases, the base graph may include additional rules specific to probabilistic shaping, in which case the parity bits of the base graph may be mapped to the MSB, but the next most significant bits are mapped to the degree two nodes (e.g., more degree two nodes mapped to the second MSBs than to the third MSBs). An interleaver may also be defined to map the lifted base graph to symbols, and in some cases, the UE may report its capability to support one or more interleavers, or the network entity may configure the UE with an interleaver.

Figure 2:
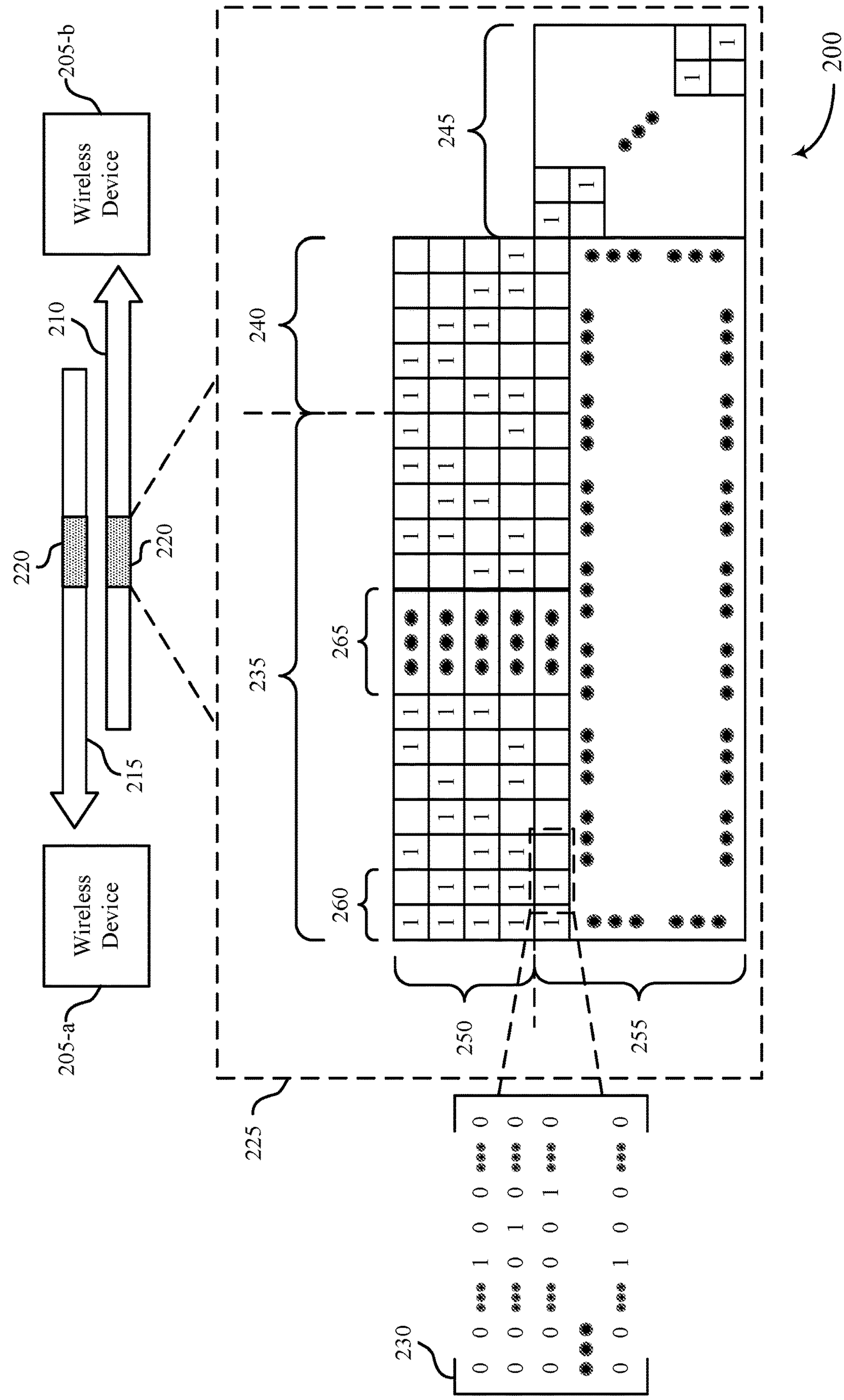
FIG. 2 shows an example of a wireless communications system that supports joint LDPC coding and modulation designs in accordance with one or more aspects of the present disclosure.

FIG. 2 shows an example of a wireless communications system 200 that supports joint LDPC coding and modulation designs in accordance with one or more aspects of the present disclosure. The wireless communications system may implement aspects of the wireless communications system 100 or may be implemented by aspects of the wireless communications system 100. For example, the wireless communications system 200 may include a wireless device 205-*a* and a wireless device 205-*b*, which may be examples of corresponding devices described herein (e.g., a network entity 105, a UE 115). The wireless device 205-*a* may communicate with the wireless device 205-*b* via the communication link 210 and the communication link 215. The communication link 210 and the communication link 215 may be either the uplink or the downlink, and in some cases may be a sidelink connection. A device transmitting a signal 220, or a message, (e.g., in the uplink, downlink, or sidelink) may be referred to as a transmitting device, and a device receiving the signal 220 (e.g., in the uplink, downlink, or sidelink) may be referred to as a receiving device.

The wireless communications system 200 may implement forward error correction (FEC) to reduce transmission errors when performing communications over unreliable or noisy channels. In some examples, the wireless device 205-*a* may be a transmitting device and may transmit a signal to the wireless device 205-*b*, which may be a receiving device, according to an error correction code. For example, the wireless device 205-*a* may transmit a signal 220 using a LDPC code (e.g., a quasi-cyclic (QC) LDPC code). The LDPC code may be described or defined by a base graph 225 (e.g., a protograph) and a lifting matrix 230. The base graph 225 may capture (e.g., represent) the macroscopic properties of the LDPC code (e.g., a threshold).

In some examples, the base graph 225 may be represented as a matrix (e.g., a base matrix). The base graph 225 may include multiple columns and multiple rows. Each column of the multiple columns of the base graph 225 may denote (e.g., be defined as) a variable node, and each row of the multiple rows of the base graph 225 may denote (e.g., may be defined as) a check node. The multiple variable nodes of the base graph 225 may be further include multiple information nodes 235, multiple core parity nodes 240, and multiple extension parity nodes 245. The multiple check nodes of the base graph 225 may include multiple core check nodes 250 and multiple extension check nodes 255. Each variable node may be associated with a degree, which may denote a quantity of check nodes associated with each variable node. For example, the degree associated with a variable node may indicate that the variable node is associated with a quantity of edges of the base graph 225 (e.g., non-zero elements of the variable node). In some cases, the first and second variable nodes of the base graph 225 may be punctured information nodes 260 (e.g., a non-transmitted node). Additionally, or alternatively, the multiple information nodes 235 may include one or more special extension check nodes 265.

The LDPC code may be further described by a lifting matrix 230. For example, the LDPC code may be described by a circulant identity matrix, and the wireless device 205-*a*, the wireless device 205-*b*, or both the wireless device 205-*a* and the wireless device 205-*b* may lift (e.g., perform a lifting operation) each entry of the base graph 225 according to the circulant identity matrix. The cyclic shift associated with the circulant identity matrix may be indicated by a non-zero value in the base graph 225. In some examples, each variable node of the base graph 225 may be associated with a quantity of coded bits associated with the LDPC code, and the dimensions of the lifting matrix 230 (e.g., width, height, or both) may be equal to the quantity of coded bits. In such examples, the wireless device 205-*b*, or both the wireless device 205-*a* and the wireless device 205-*b* may create a quantity of copies of the base graph 225 equal to the quantity of coded bits and may connect the quantity of copies of the base graph 225 via edge permutation. By performing the lifting operation, the wireless device 205-*b*, or both the wireless device 205-*a* and the wireless device 205-*b* may preserve a degree distribution of each coded bit.

The wireless device 205-*a* and the wireless device 205-*b* may perform a high-order modulation operation (e.g., 256QAM) to map the coded bits to a modulation constellation. In some examples, mapping the coded bits may be associated with an interleaver. The wireless device 205-*a* and the wireless device 205-*b* may further implement shaping (e.g., probabilistic shaping) to convert a uniform modulation constellation into a non-uniform modulation constellation. However, in some cases, a base graph 225 may not be compatible with higher-order modulation operations because generating a large quantity of complex copies of the base graph 225 (e.g., during lifting) may generate a significant increase in overhead to support high throughput of higher modulation orders.

In some examples, as described herein with reference to FIGS. 3-8, the wireless device 205-*a* may generate a LDPC code according to a base graph, which may be defined by variable nodes (e.g., columns of the base graph 225) and check nodes (e.g., rows of the base graph 225). Such a base graph may support second degree variable nodes (e.g., variable nodes that correspond to two non-zero check nodes) in the information nodes (e.g., core) of the base graph. Further, the base graph may include more degree two nodes associated with higher significance bits than with lower significance bits (e.g., more degree two nodes associated with MSBs or second MSBs than with third MSBs or LSBs, among other examples). Each significance level may be associated with a channel reliability, with higher significance levels corresponding to higher channel reliability. In some cases, the base graph may be a universal base graph applicable to uniform shaping or probabilistic shaping. In some other cases, different designs for a base graph or alternative rules for the base graph may apply specifically to uniform shaping or probabilistic shaping, respectively. An interleaver may also be defined to map the base graph to symbols after performing a lifting operation.

Figure 3:
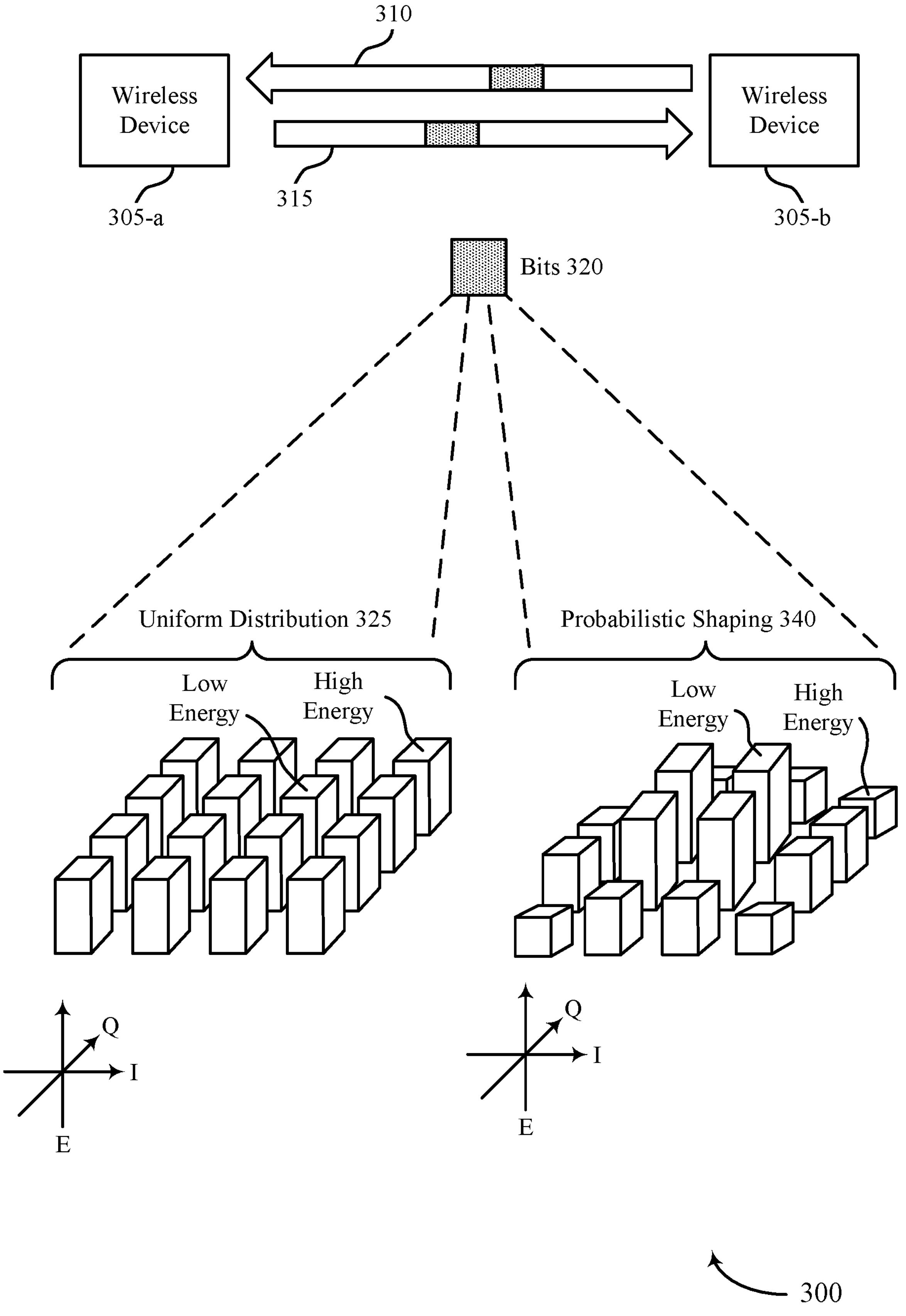
FIG. 3 shows an example of a wireless communications system that supports joint LDPC coding and modulation designs in accordance with one or more aspects of the present disclosure.

FIG. 3 shows an example of a wireless communications system 300 that supports joint LDPC coding and modulation designs in accordance with one or more aspects of the present disclosure. The wireless communications system 300 may implement aspects of the wireless communications system 100 or may be implemented by aspects of the wireless communications system 100. For example, the wireless communications system 300 may include a wireless device 305-*a* and a wireless device 305-*b*, which may be examples of corresponding devices described herein (e.g., a network entity 105, a UE 115). The wireless device 305-*a* may communicate with the wireless device 305-*b* via the communication link 310 and the communication link 315. The wireless devices 305 may communicate one or more bits 320. The communication link 310 and the communication link 315 may be either the uplink or the downlink, and in some cases may be a sidelink connection. A device transmitting a signal, or a message, (e.g., in the uplink, downlink, or sidelink) may be referred to as a transmitting device, and a device receiving the transmitted signal (e.g., in the uplink, downlink, or sidelink) may be referred to as a receiving device.

Generally, the wireless communications system 300 illustrates an example of the wireless device 305-*a* and the wireless device 305-*b* communicating via the communication link 310 and the communication link 315. For example, the wireless device 305-*a*, the wireless device 305-*b*, or both, may transmit a signal modulated to represent one or more bits 320. For example, the one or more bits 320 may be transmitted via a message including a distribution of modulated symbols, where each symbol in the distribution may represent one or more bits.

Some wireless communications systems (e.g., cellular, Wi-Fi) may utilize higher order modulation (e.g., 16 quadrature amplitude modulation (QAM), 64 QAM, 256 QAM, 1024QAM, 4096QAM) to increase spectral efficiency for wireless transmissions at higher signal-to-noise-ratio (SNR) values. In such systems, constellations of modulated symbols may be fixed (e.g., may be square constellations), where each constellation point (e.g., value, symbol) may have a same probability of being used as another constellation point (e.g., each constellation point may be used with equal probability). In some examples, as information rate increases, the SNR of uniform modulation (e.g., 16 QAM, 64 QAM, 256 QAM, quadrature phase shift keying (QPSK)) as well as probabilistic shaping (e.g., a uniform distribution 325 with a same energy (E) for each constellation point defined by I (in-phase carrier) on the X axis and Q (quadrature carrier) on the Y axis). Optimized constellation distribution may plateau (e.g., initially, for a given modulation scheme or shaping scheme, an increase in SNR may result in an increase in information rate, however at some point, SNR may continue to increase while information rate remains the same). Probabilistic shaping may plateau at the same information rate as the 256 QAM, and plateau at higher information rates than other uniform QAM.

In some cases, the distribution of symbols may be shaped such that different symbols may have different probabilities of usage, where such a distribution may be referred to as a non-uniform distribution of symbols. For example, a non-uniform distribution of symbols may include a first set of symbols with respective probabilities of usage below a first probability level and a second set of symbols with respective probabilities of usage above or equal to the first probability level. In such cases, the first set of symbols may include one or more probabilities below the first probability level (e.g., different probabilities below the first probability level) and the second set of symbols may include one or more probabilities above or equal to the first probability level (e.g., different probabilities above or equal to the first probability level).

A non-uniform distribution (e.g., Gaussian-like distribution) of symbols may be shaped using one or more probabilistic shaping techniques (e.g., according to probabilistic shaping 340). Probabilistic shaping may be a technique used to increase spectral efficiency of the coded modulation, and may generate non-uniformly distributed coded modulation symbols, or non-uniformly distributed constellations. In some examples, non-uniformly distributed QAM may have a higher capacity than a uniformly distributed QAM. Such non-uniform distributions may result in higher transmission capacities, higher spectral efficiencies, or generally higher communication quality than uniform symbol distributions. For example, non-uniformly distributed constellations may be associated with a larger mutual information (e.g., an information I, defined by parameters X and Y) than uniformly distributed constellations, at the same SNR. Non-uniformly distributed constellations (e.g., a Maxwell-Boltzmann distribution) may maximize a source entropy for a given average power. In such cases, inner constellations of the non-uniformly distributed constellations may be used with higher probability levels.

An example of a probabilistic shaping framework (e.g., for generating probabilistic shaping 340) may be probabilistic amplitude shaping (PAS) (e.g., distribution matching). PAS may shape an amplitude of a constellation of modulated symbols (e.g., the amplitude may be non-uniform), while leaving the sign of the constellation uniformly distributed. In some examples, PAS may be performed prior to channel coding of information bits. In some examples, PAS may perform shaping on information bits (e.g., shaping the bits for distribution into a non-uniform constellation of symbols), and may utilize systematic channel codes. For example, PAS may use a systematic channel code to preserve the shaping applied to the information bits (e.g., the shaping may be preserved during channel coding, which may occur after shaping). In PAS, parity bits may not be shaped, and instead may be mapped to the signs of the constellations (e.g., which signs may not be shaped in PAS).

PAS may be based on code. In some other examples, PAS may be based on source compression techniques, such as arithmetic coding (e.g., Huffman code). Source coding may convert non-uniformly distributed sources into uniform bits, and PAS may reverse the conversion. Techniques for PAS may include CCDM (constant-composition distribution matching), multi-CCDM (multiple composition distribution matching), sphere shaping (constraining the input codeword (a multi-dimensional complex vector) into a power sphere), etc. However, to apply such schemes to a commination system, the compression of the bits may be specified. For example, the compression algorithm may be specified up to fixed-points, which may be quantized by the probability values of a defined precision. Additionally, specification of the compression algorithm may include different configurations for shaping rate, target prob distribution, block length, modulation order, etc. In some examples, the source code may be non-linear. In some examples, PAS may be based on source code based on a source compression algorithm (e.g., arithmetic coding, Huffman code) to shape the information bits to a given probability distribution, followed by the use of a high rate systematic code to encode the shaped information bits. Using a high rate systematic code may preserve the distribution on the information bits. In some other examples, the PAS may be based on block code (e.g., polar code), which may generate masking bits to mask the information bits to a specific distribution.

The wireless device 305-*a* and the wireless device 305-*b* may perform a higher-order modulation operation (e.g., 256QAM) to convert a uniform distribution 325 into a non-uniform modulation constellation using probabilistic shaping 340. However, in some cases, a base graph may not be compatible with the higher-order modulation operation because generating a large quantity of complex copies of the base graph (e.g., during lifting) may generate a significant increase in overhead to support high throughput of higher modulation orders.

As described herein with reference to FIGS. 4-8, the wireless device 305-*a* may generate a LDPC code according to the base graph, which may be defined by variable nodes (e.g., columns of the base graph) and check nodes (e.g., rows of the base graph). The base graph may support second degree variable nodes (e.g., variable nodes that correspond to two non-zero check nodes) in the information nodes (e.g., core) of the base graph. Further, the base graph may include more degree two nodes associated with higher significance bits than with lower significance bits (e.g., more degree two nodes associated with MSBs or second MSBs than with third MSBs or LSBs, among other examples). Each significance level may be associated with a channel reliability, with higher significance levels corresponding to higher channel reliability. In some cases, the base graph may be a universal base graph applicable to a uniform distribution 325 or a non-uniform distribution based on probabilistic shaping 340. In some other cases, different designs for a base graph or alternative rules for the base graph may apply specifically to uniform shaping or probabilistic shaping, respectively. An interleaver may also be defined to map the base graph to symbols after performing a lifting operation.

Figure 4:
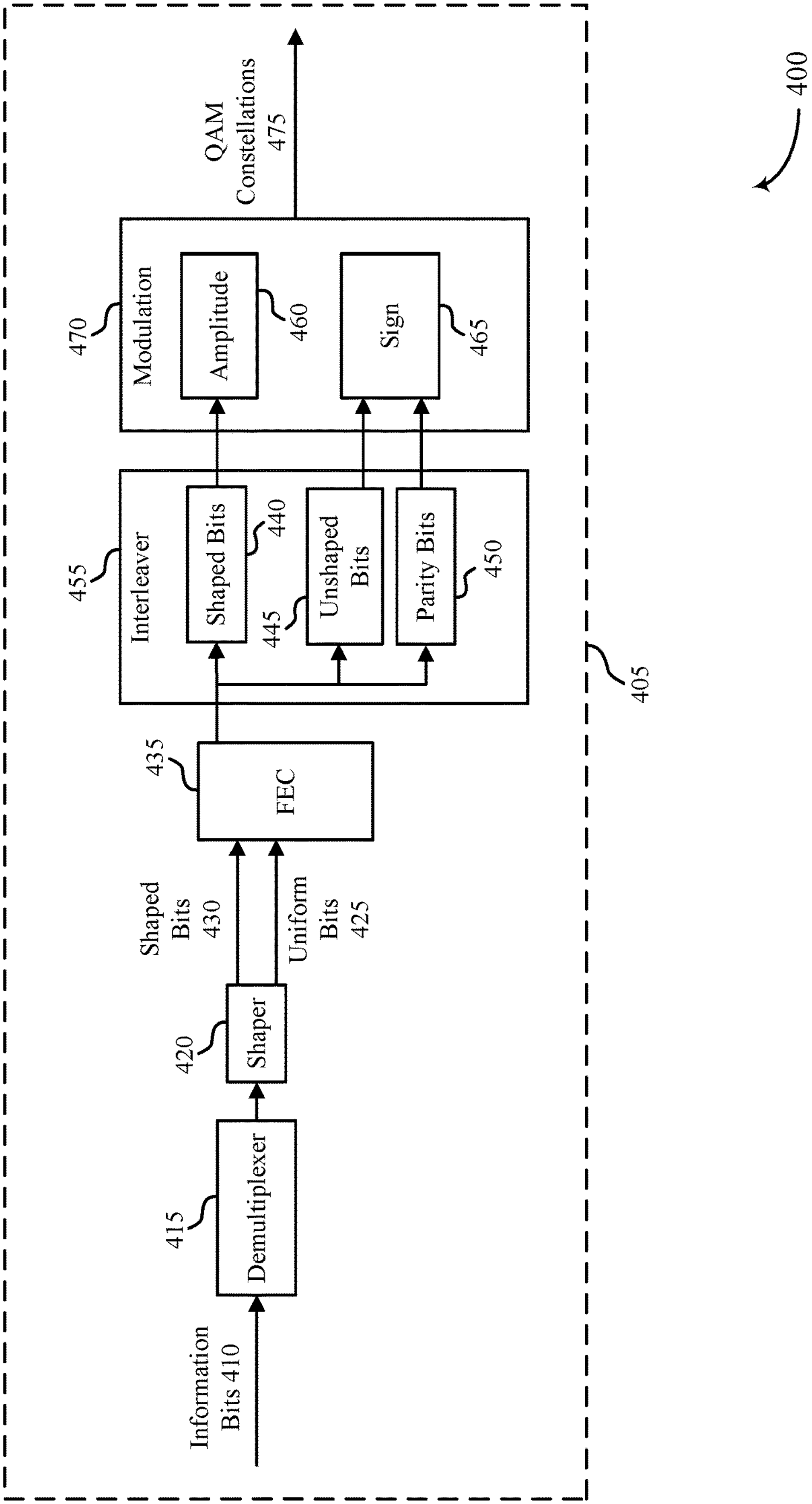
FIG. 4 shows an example of a signaling scheme that supports joint LDPC coding and modulation designs in accordance with one or more aspects of the present disclosure.

FIG. 4 shows an example signaling diagram 400 that supports joint LDPC coding and modulation designs in accordance with one or more aspects of the present disclosure. The signaling diagram 400 may implement aspects of the wireless communications system 100, the wireless communications system 200, the wireless communications system 300, or any combination thereof, or may be implemented by aspects of the wireless communications system 100, the wireless communications system 200, the wireless communications system 300, or any combination thereof. For example, the signaling diagram 400 may be an example of communications between the wireless devices 205 as described herein with reference to FIG. 2, the wireless devices 305 as described herein with reference to FIG. 3, or both. In some examples, a wireless device 405 (e.g., a transmitting device) may perform joint LDPC coding and modulation according to the signaling diagram 400. The wireless device 405 may input information bits 410 into a demultiplexer 415 to prepare the information bits 410 for shaping (e.g., probabilistic shaping).

In some examples, in accordance with probabilistic shaping (such as probabilistic amplitude shaping (PAS)), the wireless device 405 may input information bits 410 (e.g., an information payload, a set of input bits associated with a data message) into a shaper 420, which may be a probabilistic shaper. The shaper 420 may output a set of uniform bits 425 and a set of shaped bits 430 and may input the two sets of bits into the FEC encoder 435. The shaper 420 may transform some or all of the information bits 410 (e.g., the set of uniform bits 425) into non-uniformly distributed bits (e.g., the set of shaped bits 430) according to a given target probability distribution. The wireless device 405 may additionally input a set of parity bits into the FEC encoder 435 associated with the information payload. In some aspects, the FEC encoder 435 may be a high rate systematic FEC encoder.

The FEC encoder 435 may output a set of shaped bits 440 (e.g., information bits, systematic bits), a set of unshaped bits 445 (e.g., information bits, systematic bits), and a set of parity bits 450 (which may also be unshaped). The wireless device 405 may map the set of shaped bits 440, the set of unshaped bits 445, and the set of parity bits 450 according to an interleaver 455. For example, the wireless device 405 may map the set of shaped bits 440, which may be non-uniformly distributed or biased, to an amplitude 460 of one or more constellation points of a modulation constellation 470 and may map the set of unshaped bits 445, which may be uniformly distributed or unbiased, and the set of parity bits 450 to a sign 465 of one or more constellation points of the modulation constellation 470. As such, for a given constellation point, an amplitude 460 of the constellation point may be shaped while a sign 465 of the constellation point may remain unshaped (and associated with a uniform distribution). In some examples, the resulting modulation symbols of the modulation constellation 470 may be non-uniformly distributed. In some aspects, the modulation constellation 470 may be associated with a QAM modulation and an output of the QAM modulation may be non-uniformly distributed QAM constellations 475.

A second device (e.g., a receiving device) may receive information bits encoded in a signal or symbols according to the base graph. For example, the second device may receive an indication of a modulation constellation that may include the signal. In some examples, the second device may demodulate the received signal or symbols. The second device may further unmap coded bits from a modulation constellation. In some cases, the second device may decode the coded bits after unmapping the bits. In such cases, the second device may demultiplex the now decoded information bits. The second device may then perform a de-shaping procedure (e.g., compress a non-uniform distribution into a uniform distribution) on the non-uniformly distributed bits. Finally, the second device may multiplex the de-shaped data to receive the information bits.

In some examples of techniques described herein, a transmitting device may generate a set of shaped bits (e.g., including shaping bits and information bits), and may transmit a message including the shaped bits to a receiving device. For example, the transmitting device may encode the shaped bits 430 according to an FEC encoder 435 (e.g., LDPC), which may be based on a base graph. The base graph may be defined by variable nodes (e.g., columns of the base graph) and check nodes (e.g., rows of the base graph). The base graph may support second degree variable nodes (e.g., variable nodes that correspond to two non-zero check nodes) in the information nodes (e.g., core) of the base graph. Further, the base graph may include more degree two nodes associated with higher significance bits than with lower significance bits (e.g., more degree two nodes associated with MSBs or second MSBs than with third MSBs or LSBs, among other examples). Each significance level may be associated with a channel reliability, with higher significance levels corresponding to higher channel reliability. In some cases, the base graph may be a universal base graph applicable to a uniform distribution or a non-uniform distribution based on shaping (e.g., probabilistic shaping) performed by the shaper 420. In some other cases, different designs for a base graph or alternative rules for the base graph may apply specifically to uniform shaping or probabilistic shaping, respectively. An interleaver 455 may also be defined to map the base graph to symbols after performing a lifting operation.

Figure 5:
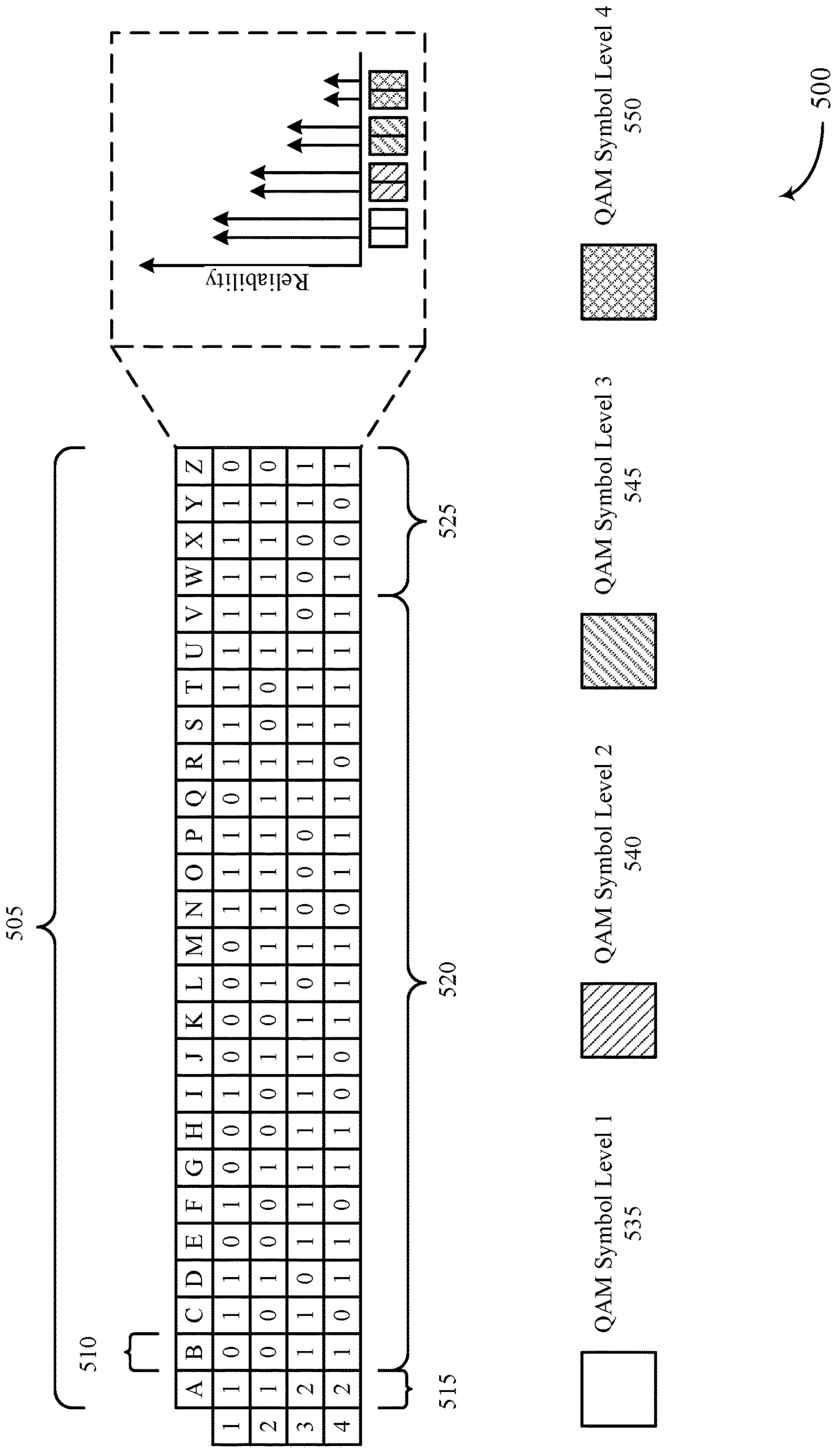
FIG. 5 shows an example of a base graph design that supports joint LDPC coding and modulation designs in accordance with one or more aspects of the present disclosure.

FIG. 5 shows an example of a base graph design 500 that supports joint LDPC coding and modulation designs in accordance with one or more aspects of the present disclosure. The base graph design 500 may implement aspects of the wireless communications system 100, the wireless communications system 200, the signaling diagram 400, or any combination thereof, or may be implemented by aspects of the wireless communications system 100, the wireless communications system 200, the signaling diagram 400, or any combination thereof. Transmissions between two wireless devices (which may be examples of wireless devices 205 as described herein with reference to FIG. 2, wireless device 405 as described herein with reference to FIG. 5, or any combination thereof) may be encoded according to a LDPC code. In such examples, a transmitting device may transmit a signal including one or more coded bits to a receiving device based on encoding the signal. The receiving device may decode the signal based on receiving the signal and generating a LDPC code associated with the signal.

The base graph 505 may include one or more variable nodes 510. The variable nodes may further include one or more punctured nodes 515 (e.g., in a first node position, such as node A of base graph 505), a set of information nodes 520, and a set of parity nodes 525. As described herein with reference to FIG. 2, each of the one or more variable nodes 510 may be associated with a degree. In such cases, a numerical value associated with each degree may indicate that each of the one or more variable nodes 510 is associated with a quantity of check nodes similar to (e.g., equal to) the numerical value associated with each degree. For example, one or more variable nodes 510 of the base graph 505 may be associated with two check nodes (e.g., second degree nodes), and one or more variable nodes 510 of the base graph 505 may be associated with three check nodes (e.g., third degree nodes). The set of parity nodes 525 may be associated with (e.g., may include) a chain of second degree nodes.

In some examples, as described herein, the base graph 505 may be designed for LDPC code, and may support one or more features resulting in increased throughput and higher modulation orders. For example, the base graph 505 may be more sparse than some other base graph designs for lower complexity implementation (e.g., more sparse than a base graph design referred to as base graph 1 (BG1)) in terms of average variable node degree. The base graph 505 may support second degree (e.g., Deg-2) variable nodes in the information nodes 520 (e.g., core nodes), and may support more second degree nodes associated with MSBs than associated with less significant bits, such as the LSB. Variable nodes mapping to the LSB may be third degree nodes or higher degree nodes than third degree nodes. Such a code may be used for a subset of modulation orders (e.g., for modulation order 16 QAM or above, base graph 505 may be used, while for modulation orders less than 16 QAM another base graph may be used).

In some examples, the one or more coded bits associated with the LDPC code may be transmitted or received through different channels. Each channel may be associated with a reliability. In some cases (e.g., higher-order QAM), one or more bits may occupy a same QAM symbol in time. In such cases, a first bit associated with a first symbol significance level may have a different significance than a second bit associated with a second symbol significance level. For example, the base graph 505 may be associated with a first level QAM symbol 535 (e.g., a MSB), a second level 2 QAM symbol 540 (e.g., a 2nd MSB), a third level QAM symbol 545 (e.g., a 3rd MSB), and a fourth level QAM symbol 550 (e.g., a LSB). In such examples, a lower numerical value associated with the symbol significance level may correspond to a higher bit significance and a higher reliability (e.g., a MSB may be associated with reliability level 1 with a highest reliability, while a LSB may be associated with reliability level 4 with a lowest reliability).

In some examples, the base graph 505 may include second degree nodes within the set of information nodes 520. In such examples, the average degree of the one or more variable nodes 510 of the base graph 505 may decrease (e.g., become sparse). A base graph 505 that is sparse may be less computationally complex and may incur reduced power consumption at a wireless device. For example, a base graph 505 that is 13% sparser than another base graph may perform 13% fewer cycles per encoding or decoding iteration.

The base graph 505 may support an improved complexity to performance tradeoff compared to other base graphs. In some examples, based on generating the LDPC code using a base graph 505 that is sparse, one or more communication parameters associated with communications between wireless devices may improve. For example, a threshold signal-to-noise ratio (SNR) may decrease relative to a quantity of modulation iterations normalized with respect to a total quantity of edges of the base graph 505. Additionally, or alternatively, the base graph 505 may include a first quantity of second degree nodes associated with the MSB of the one or more coded bits that is greater than a second quantity of second degree nodes associated with the LSB of the one or more coded bits. In some cases, one or more variable nodes 510 may map to the LSB of the one or more coded bits. In such cases, the numerical value of the degree associated with the LSB may be three or greater.

The transmitting device may generate the LDPC code based on a base graph 505. The base graph 505 may be referred to as base graph 3 (BG3). In some examples, the base graph 505 may be based on a modulation order. For example, the transmitting device may determine that a modulation order satisfies (e.g., is greater than, is equal to) a threshold. Based on the determination, the wireless device may select the base graph 505 for use in generating the LDPC codes.

Figure 6:
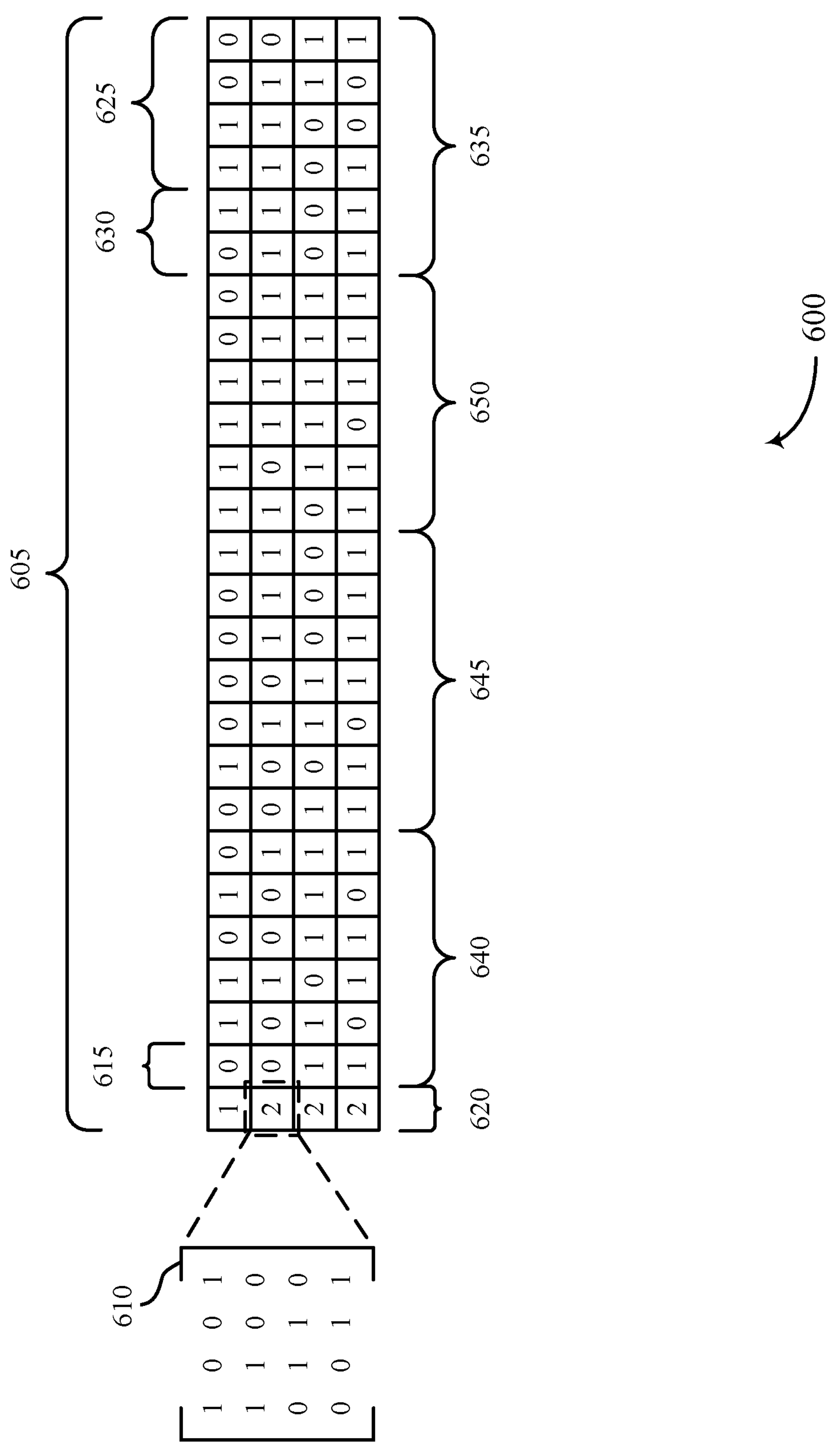
FIG. 6 shows an example of a base graph design that supports joint LDPC coding and modulation designs in accordance with one or more aspects of the present disclosure.

FIG. 6 shows an example of a base graph design 600 that supports joint LDPC coding and modulation designs in accordance with one or more aspects of the present disclosure. The base graph design 600 may implement aspects of the wireless communications system 100, the wireless communications system 200, the wireless communications system 300, the signaling diagram 400, the base graph design 500, or any combination thereof, or may be implemented by aspects of the wireless communications system 100, the wireless communications system 200, the wireless communications system 300, the signaling diagram 400, the base graph design 500, or any combination thereof. For example, transmissions between two wireless devices (which may be examples of wireless devices 205 as described herein with reference to FIG. 2, wireless devices 305 as described herein with reference to FIG. 3, wireless device 405 with respect to FIG. 4, or any combination thereof) may be encoded according to a LDPC code. In such examples, a transmitting device may transmit a signal including one or more coded bits to a receiving device based on encoding the signal. The receiving device may decode the signal based on receiving the signal and generating a LDPC code associated with the signal.

The transmitting device may generate the LDPC code based on a base graph 605. In some cases, the base graph 605 may be the same as, based on, or similar to the base graph 505 as described herein with reference to FIG. 5. In some other cases, the base graph 605 may be different from the base graph 505 as described herein with reference to FIG. 5.

In some examples, the base graph 605 is associated with a PAS procedure. For instance, a first base design (e.g., as illustrated with reference to the example base graph 505) may apply to uniform shaping procedures, and another base graph design (e.g., as illustrated with reference to the base graph 605) may apply to probabilistic shaping procedures. In such examples, the transmitting device, the receiving device, or both the transmitting device and the receiving device may perform lifting on the base graph 605 according to a lifting matrix 610, which may be a dual-diagonal lifting matrix. Similar base graph designs as described with reference to FIG. 5 may be implemented specifically for probabilistic shaping scenarios. However, for probabilistic shaping, parity bits and unshaped information bits may be mapped to the MSB of a constellation. In such examples, the base graph design and mapping design described with reference to FIG. 5 may be altered or adjusted to accommodate the mapping of parity bits and unshaped information bits to the MSB.

In some examples, the base graph design may be the same for uniform QAM or may be different, and may be designed for probabilistic shaping. The core of the base graph design may process one or more features (e.g., along with, instead of, or in addition to, design features described with reference to FIG. 5). Additionally, or alternatively, the base graph 605 may be based on a modulation order. For example, the transmitting device may determine that a modulation order satisfies (e.g., is greater than, is equal to) a threshold. Based on the determination, the wireless device may select the base graph 605 for use in generating the LDPC codes.

The base graph 605 may include one or more variable nodes 615. The base graph 605 may further include one double-edged punctured node 620 in a first node position, a set of parity nodes 625, and a set of unshaped bits 630 (e.g., unshaped systematic bits). The set of unshaped bits 630 may be at the beginning of the set of information nodes of the base graph 605 or at the end of the set of information nodes of the base graph 605. As described herein with reference to FIG. 2, each of the one or more variable nodes 615 may be associated with a degree. In such cases, a numerical value associated with each degree may indicate that each of the one or more variable nodes 615 is associated with a quantity of check nodes similar to (e.g., equal to) the numerical value associated with each degree. For example, one or more variable nodes 615 of the base graph 605 may be associated with two check nodes (e.g., second degree nodes), and one or more variable nodes 615 of the base graph 605 may be associated with three check nodes (e.g., third degree nodes). The set of parity nodes 525 may be associated with (e.g., may include) a chain of second degree nodes.

In some examples, the transmitting device may map the elements of the base graph 605 (e.g., one or more parity bits and one or more unshaped bits of the coded bit) to a first MSB 635 of a modulation constellation. Additionally, or alternatively, the base graph 605 may include a first quantity of second degree nodes associated with the second MSB 640 (e.g., the first bits that map to an amplitude of a modulation constellation) of the one or more coded bits and a second quantity of second degree nodes associated with the third MSB 645 that is greater than a third quantity of second degree nodes associated with a LSB 650 of the one or more coded bits. In some cases, a first quantity of second degree nodes associated with the first MSB 635 may be greater than a second quantity of second degree nodes associated with the LSB 650. That is, there may be more second degree nodes associated with the second most significant bit (e.g., a first bit mapping to the amplitude) and a third most significant bit than associated with the LSB. Second degree nodes may be supported in the parity portion of the base graph 605 (e.g., the parity nodes 625), and may be supported for variable nodes corresponding to unshaped bits 630 (e.g., unshaped systematic bits) that map to the MSB of the constellation.

In some examples, the base graph 605 may be a unified base graph 605 capable of operating in a system where uniform QAM, PAS, or both are implemented. In such examples, a transmitting device, a receiving device, or both a transmitting device and a receiving device may encode signals according to an LDPC code associated with a single unified base graph 605.

As described herein with reference to FIG. 6, the base graph design (e.g., as illustrated with reference to FIG. 6) may result in communication improvements, such as increased gain via a smaller quantity of iterations. Because the base graph 605 (e.g., specific to probabilistic shaping, or universally applied to various shaping scenarios) may be sparser than other base graphs, and a decoding complexity per quantity of cycles per iteration may be decreased with reference to less sparse base graphs. In some examples, a single base graph design (e.g., the base graph 505 or the base graph 605) may be applied universally for uniform shaping, probabilistic shaping, or other encoding procedures.

Figure 7:
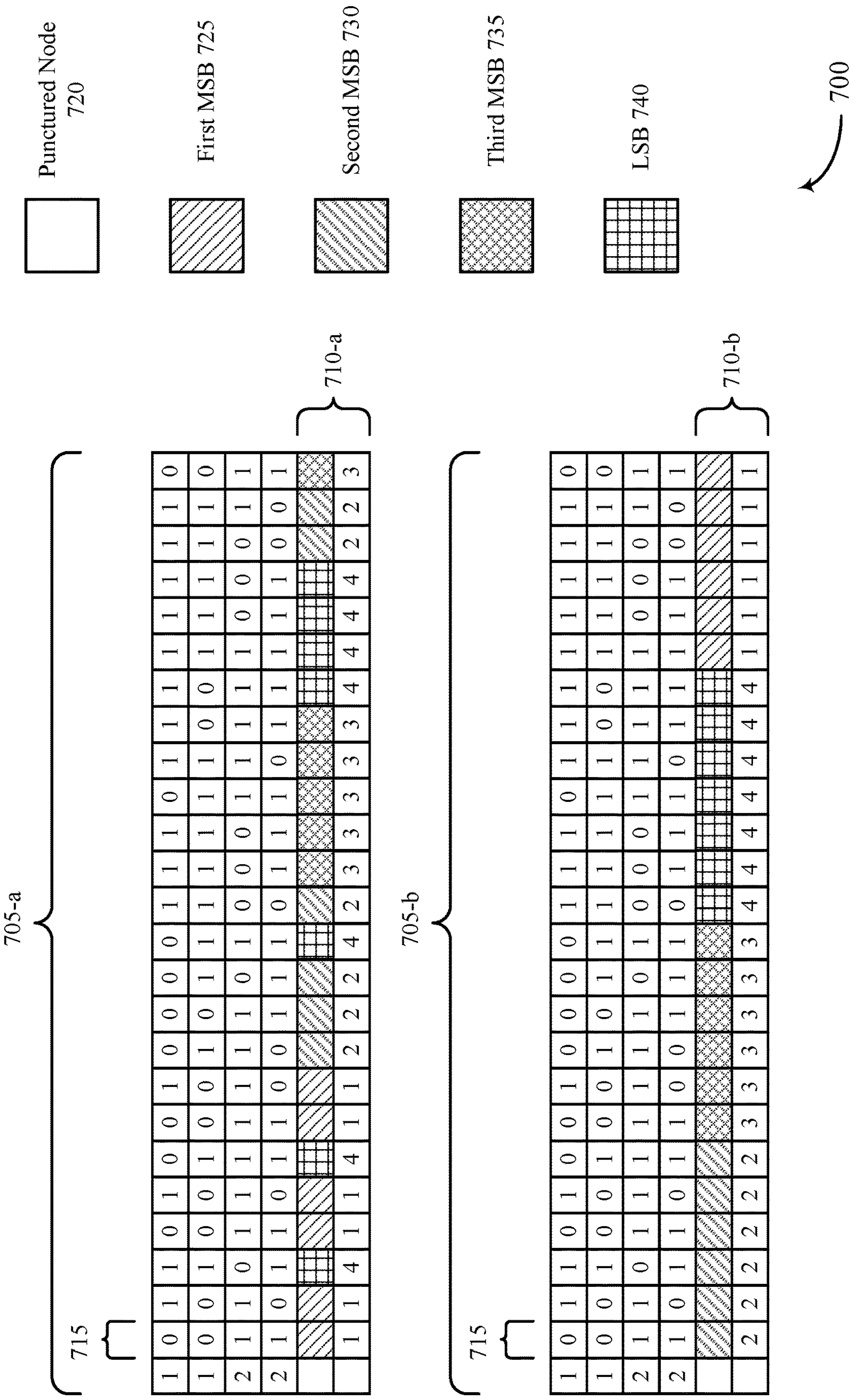
FIG. 7 shows an example of a interleaver design that supports LDPC and modulation designs in accordance with one or more aspects of the present disclosure.

FIG. 7 shows an example of an interleaver design 700 that supports LDPC coding and modulation designs in accordance with one or more aspects of the present disclosure. The interleaver design 700 may implement aspects of the wireless communications system 100, the wireless communications system 200, the wireless communications system 300, the signaling diagram 400, the base graph design 500, the base graph design 600, or any combination thereof, or may be implemented by aspects of the wireless communications system 100, the wireless communications system 200, the wireless communications system 300, the signaling diagram 400, the base graph design 500, the base graph design 600, or any combination thereof. Transmissions between two wireless devices (which may be examples of wireless devices 205 as described herein with reference to FIG. 2, wireless devices 305 as described herein with reference to FIG. 3, wireless device 405 with respect to FIG. 4, or any combination thereof) may be encoded according to a LDPC code. In some examples, the wireless devices may perform bit to modulation mapping according to one or more examples of a systematic bit prioritized mapping (SBPM) scheme, and the wireless devices may map the coded bits to the modulation constellation sequentially (e.g., in bit order). In some examples, the systematic portion of coded bits may be mapped to an MSB of the modulation constellations, and non-systematic bits may be mapped to the LSB of a modulation constellation. However, an error floor performance of an LDPC code may be poor due to mapping parity bits to the LSB. Further, probabilistic shaping may rely on mapping systematic bits to LSBs and parity bits to MSBs of the modulation, which may be different from an SBPM scenario.

As described herein, the wireless devices may generate the LDPC code based on a first base graph 705-*a* or a second base graph 705-*b*, and may perform bit to constellation mapping according to the base graph and an interleaver, such as the interleaver 710-*a*, the interleaver 710-*b*, or both. In some cases, a single interleaver (e.g., the interleaver 710-*a*) may be applied universally (e.g., regardless of shaping procedure). In some examples, a first interleaver (e.g., the interleaver 710-*a*) may be applied to uniform shaping scenarios, while another interleaver (e.g., the interleaver 710-*b*) may be applied to probabilistic shaping scenarios. In some examples, as described herein, the term interleaver may refer generally to bit to modulation mapping, or to a pattern or set of rules under which the bit to modulation mapping is performed. Such rules or patterns may be indicated by the network via control signaling, or may be defined in one or more standards.

In some examples, a transmitting device may generate an LDCP code and perform bit-to-constellation mapping according to an interleaver. For instance, a transmitting device may map a systematic portion (e.g., information nodes) of a base graph (e.g., a first base graph 705-*a*, a second base graph 705-*b*) to a bit of a modulation constellation (e.g., a QAM constellation) associated with a high significance (e.g., a MSB) and a non-systematic portion (e.g., parity nodes) of the base graph to a bit of the modulation constellation associated with a low significance (e.g., a LSB) according to an interleaver (e.g., a first interleaver 710-*a* associated with the first base graph 705-*a* or a second interleaver 710-*b* associated with the second base graph 705-*b*. The first interleaver 710-*a* and the second interleaver 710-*b* may indicate a relationship (e.g., a mapping) between coded bits and a modulation constellation. For example, the first interleaver 710-*a* and the second interleaver 710-*b* may indicate a relationship between each of the multiple variable nodes 715 and a significance level (e.g., a significant bit), which may include a first MSB 725, a second MSB 730, a third MSB 735, and a LSB 740. In some examples, the first interleaver 710-*a* and the second interleaver 710-*b* may be examples of a systematic bit prioritized mapping (SBPM) scheme, and the wireless devices may map the coded bits to the modulation constellation sequentially (e.g., in bit order)

Both the first base graph 705-*a* and the second base graph 705-*b* may include multiple variable nodes 715. Additionally, or alternatively, both the first base graph 705-*a* and the second base graph 705-*b* may include a punctured node 720 in a first slot of the multiple variable nodes 715. As described herein with reference to FIG. 2, each of the multiple variable nodes 715 may be associated with a degree. In some cases, the first base graph 705-*a* and the second base graph 705-*b* may be the same as the base graph 505 as described herein with reference to FIG. 5. In some other cases, the first base graph 705-*a* and the second base graph 705-*b* may be different from the base graph 505 as described herein with reference to FIG. 5. For example, the first base graph 705-*a* and the second base graph 705-*b* may be the same as the base graph 605 or may not be the same as the base graph 605 as described herein with reference to FIG. 6. In some examples, the first base graph 705-*a* may not be associated with PAS, and the second base graph 705-*b* may be associated with PAS.

In some cases where the LDPC code is not associated with PAS, the wireless devices may perform communications according to the first base graph 705-*a*. In such cases, the wireless devices may map the multiple variable nodes 715 to a modulation constellation according to the first interleaver 710-*a*. For example, the first interleaver 710-*a* may define a degree-based bit-to-constellation mapping (e.g., a degree interleaver), and the wireless devices may map nodes associated with lower degrees (e.g., having lower numeric values) to higher significance levels and may map nodes associated with higher degrees to lower significance values. In some cases where the wireless devices are operating using higher-order modulation procedures (e.g., 16 QAM, 64 QAM, 256 QAM), the first interleaver 710-*a* may indicate that a quantity of the multiple variable nodes 715 associated with the LSB 740 is less than a quantity of the multiple variable nodes 715 associated with the first MSB 725, the second MSB 730, the third MSB 735, or any combination thereof. For example, for higher order modulation, the interleaver 710-*a* may support more second degree nodes in MSBs (e.g., first MSB 725) than in less significant bits (e.g., LSBs 740). A total quantity of edges within each reliability level may not be decreasing as reliability level increase. For instance, a total quantity of edges for the first MSB 725 may be less than a total quantity of edges for the second MSB 730, which may be less than a total quantity of edges for the third MSB 735, which may be less than a total quantity of edges for the LSB 740. In some examples, after performing a lifting operation, the wireless devices may map a quantity of copies of the first base graph 705-*a* to the same significance level (e.g., a same channel reliability).

The wireless devices may reorder the multiple variable nodes 715 of the first base graph 705-*a* to perform the mapping according to the first interleaver 710-*a*. In some examples, the wireless devices may order the multiple variable nodes 715 (e.g., information nodes) of the first base graph 705-*a* in such a way that the core parity nodes are followed by the punctured node 720, then the information bits, then the first degree extensions. Information nodes may be ordered so that the degree-based interleaver 710-*a* on an original first base graph 705-*a* is similar to or equivalent to an SBPM on a reordered base graph.

In some other cases where the LDPC code is associated with PAS, the wireless devices may perform communications according to the second base graph 705-*b*. In such cases, the wireless devices may map the multiple variable nodes 715 to a modulation constellation according to the second interleaver 710-*b*. For example, the second interleaver 710-*b* may define a mapping based on probabilistic shaping (e.g., may be a bit interleaver based on the probabilistic shaping). In such cases (e.g., where PAS is being implemented), the location of the multiple variable nodes 715 within the second base graph 705-*b* may be fixed. Similarly, the locations of the multiple variable nodes associated with the first MSB 725, the multiple variable nodes 715 associated with the second MSB 730, the multiple variable nodes 715 associated with the third MSB 735, and the multiple variable nodes 715 associated with the LSB 740. As a result, the location of the significance levels relative to the second base graph 705-*b* may be fixed.

In some examples, the wireless devices may order the multiple variable nodes 715 (e.g., information nodes) of the second base graph 705-*b* in such a way that the core parity nodes are followed by the punctured node 720, then the non-shaped information nodes, followed by the shaped information nodes, then the first degree extension nodes. In such examples, the wireless devices may map the parity bits of the second base graph 705-*b* to the first MSB 725 (e.g., the sign bits of the modulation constellation). Following mapping the parity bits, the wireless devices may map the remaining bits (e.g., systematic bits) to the remaining bit locations of the interleaver in order. Additionally, or alternatively, a first quantity associated with a higher significance level (e.g., a reliability level) may be greater than a second quantity associated with a lower significance level. For example, a first quantity of edges associated with the first MSB 725 may be greater than a second quantity of edges associated with the second MSB 730, which may yet be greater than a third quantity of edges associated with the third MSB 735, which may yet be greater than a fourth quantity of edges associated with the LSB 740. In some cases, the second interleaver 710-*b* may be supported by systems implementing both PAS and uniform QAM (e.g., a transmitter or a receiver may support a unified interleaver such as the interleaver 710-*a* or the interleaver 710-*b*). In such cases, the wireless devices may support a unified interleaver to reduce computational complexity.

The wireless devices may dynamically change or adapt the bit-to-constellation mapping rule according to an interleaver 710. For example, a transmitting device (e.g., a UE) may transmit, to a receiving device (e.g., a network entity), an indication of the interleavers supported by the transmitting device. The receiving device may transmit an indication of an interleaver for encoding via DCI (e.g., explicit DCI fields, radio network temporary identifier (RNTI), medium access control-control element (MAC-CE), RRC signaling, and an association with an MCS table. In some cases, the network entity may indicate the interleaver to a base graph or to a set of frequency ranges. Additionally, or alternatively, the receiving device may determine the interleaver based on a transport block size, MCS values, redundancy versions, etc. In some examples (e.g., error floor sensitive applications), the wireless devices may select the first base graph 705-*a* (e.g., the degree interleaver). In some other examples (e.g., noise threshold sensitive), the wireless devices may select the second base graph 705-*b* or a third base graph that is different from the first base graph 705-*a* and the second base graph 705-*b*.

A stability condition may provide an indication of whether a decoder converges, as well as a convergence rate. By implementing the first interleaver 710-*a*, the second interleaver 710-*b*, or both, a stability of a modulation procedure may be improved relative to performing QPSK modulation without implementing the first interleaver 710-*a* or the second interleaver 710-*b*. Additionally, or alternatively, implementing the first interleaver 710-*a*, the second interleaver 710-*b*, or both into a LDPC code and modulation operation may improve the error floor performance relative to performing QPSK modulation without implementing the first interleaver 710-*a* or the second interleaver 710-*b*.

Figure 8:
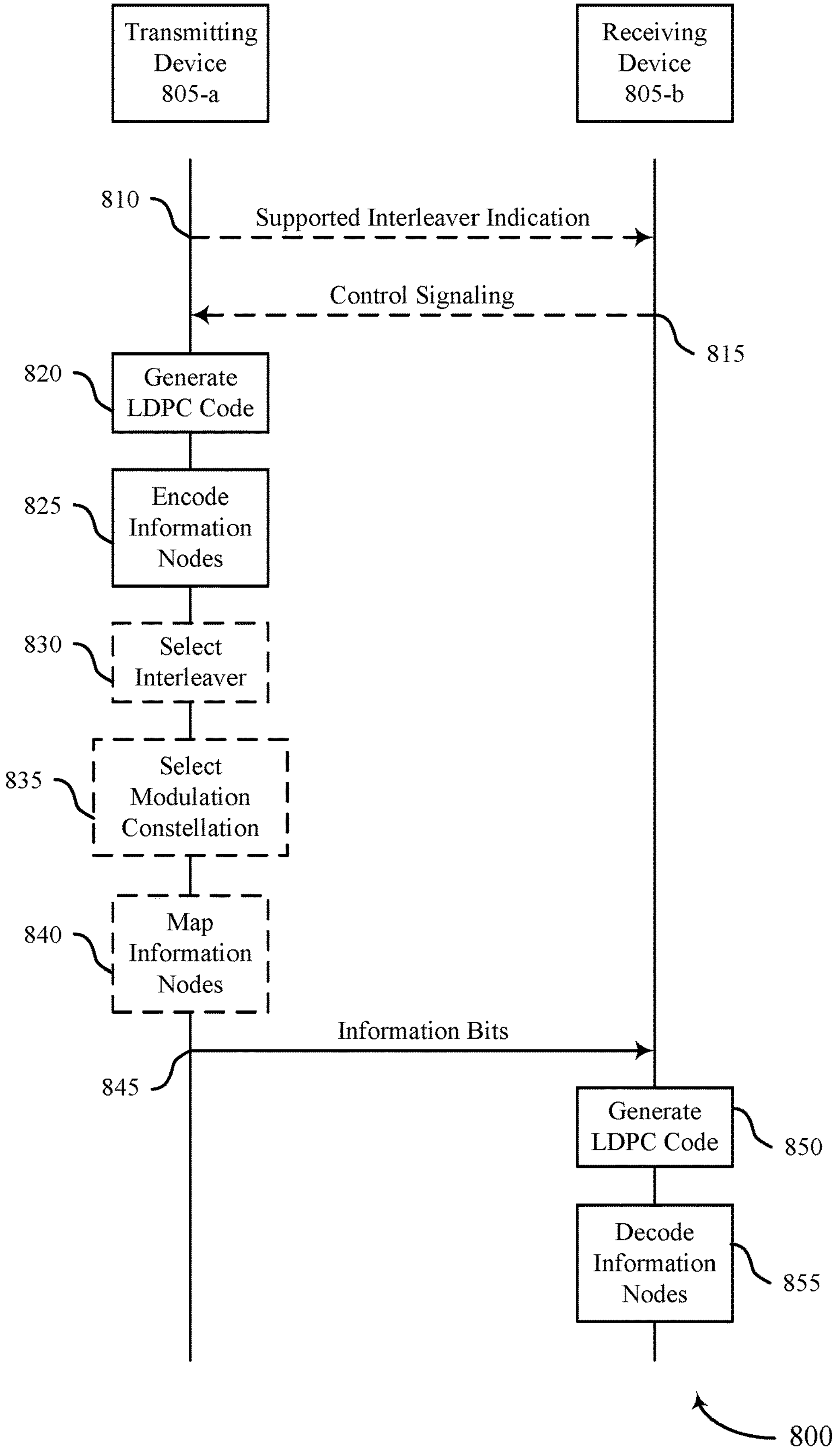
FIG. 8 shows an example of a process flow that supports joint LDPC coding and modulation designs in accordance with one or more aspects of the present disclosure.

FIG. 8 shows an example of a process flow 800 that supports joint LDPC coding and modulation designs in accordance with one or more aspects of the present disclosure. The process flow 800 may implement or be implemented by aspects of the wireless communications system 100 and the wireless communications system 200 as described herein with reference to FIGS. 1 and 2. For instance, in the example of FIG. 8, a transmitting device 805-*a* may communicate with a receiving device 805-*b*, which may be examples of corresponding devices described herein (e.g., a network entity 105, a UE 115). A device transmitting a signal, or a message, (e.g., in the uplink, downlink, or sidelink) may be referred to as a transmitting device, and a device receiving the transmitted signal (e.g., in the uplink, downlink, or sidelink) may be referred to as a receiving device. In the following description of the process flow 800, the operations between the wireless devices 805 may be transmitted in a different order than the example order shown, or the operations between the wireless devices 805 may be performed in different orders at different times. Some operations may also be omitted from the process flow 800, and other operations may be added to the process flow 800.

At 810, the transmitting device 805-*a* may transmit an indication of one or more interleavers for bit-to-constellation mapping of multiple information nodes supported by the transmitting device 805-*a*. The transmitting device 805-*a* may generate a LDPC code is based on transmitting the indication of the one or more interleavers.

At 815, the transmitting device 805-*a* may receive, from the receiving device 805-*b*, control signaling indicating a modulation order. The transmitting device 805-*a* may generate a base graph based on the modulation order satisfying a modulation order threshold. The transmitting device 805-*a* may also receive, from the receiving device 805-*b*, control signaling indicating an interleaver for bit-to-constellation mapping of the plurality of information nodes according to the base graph. The transmitting device 805-*a* may generate the LDPC code based on the control signaling indicating the interleaver. The transmitting device 805-*a* may receive an indication of the interleaver via DCI, a MAC-CE, RRC signaling, or any combination thereof. In some examples, the base graph may include a universal base graph applicable to any constellation of multiple constellations comprising a uniform modulation constellation and a probabilistic shaping modulation constellation.

At 820, the transmitting device 805-*a* may generate the LDPC code according to the base graph including multiple variable nodes and a plurality of check nodes. A first set of information nodes of the multiple variable nodes may include second degree nodes corresponding to two check nodes of the multiple check nodes.

At 825, the transmitting device 805-*a* may encode the multiple information nodes and the multiple parity nodes according to the base graph. A first quantity of the first set of information nodes may correspond to a first significance level of multiple significance levels, and a second quantity of the first set of information nodes different than the first quantity may correspond to a second significance level of the multiple significance levels. In some examples, the multiple parity nodes of the base graph may include second degree nodes corresponding to two check nodes of the multiple check nodes, the multiple parity nodes corresponding to the third significance level of the multiple significance levels that is higher than the first significance level and the second significance level. Each significance level of the multiple significance levels may correspond to a respective channel reliability. In some cases, a higher significance level may correspond to a higher channel reliability.

The first quantity of the first set of information nodes may be greater than the second quantity of the first set of information nodes, and the first significance level may be greater than the second significance level. A second set of information nodes of the multiple variable nodes may correspond to a third significance level of the multiple significance levels that is lower than the first significance level and the second significance level may include third degree nodes corresponding to three check nodes of the plurality of check nodes.

At 830, the transmitting device 805-*a* may select the interleaver for bit-to-constellation mapping of the multiple information nodes according to the base graph based on an error floor, a threshold sensitivity level, a modulation order, a capability of the transmitting device, a capability of a receiving device, or any combination thereof, The transmitting device 805-*a* may generate the LDPC code based on the selecting.

At 835, the transmitting device 805-*a* may select the uniform modulation constellation or the probabilistic shaping modulation constellation. The base graph and generating the LDPC code may be based on the selecting.

At 840, the transmitting device 805-*a* may map the multiple information nodes to multiple bits according to the interleaver indicating an inverse relationship between a degree and the significance level of each respective information node of the multiple information nodes.

Additionally, or alternatively, at 840, the transmitting device 805-*a* may also map the multiple information nodes to multiple bits according to an interleaver and based on the base graph, For each information node of the multiple information nodes, a numerical value representing the degree of the information node may be less than or equal to a respective numerical value representing the significance level corresponding to each information node. In some examples, multiple parity nodes of the base graph may include second degree nodes corresponding to two check nodes of the multiple check nodes, the multiple parity nodes corresponding to a third significance level of the multiple significance levels that is higher than the first significance level and the second significance level.

At 845, the transmitting device 805-*a* may transmit a signal including the multiple information bits and the multiple parity bits based on encoding the multiple information nodes and the multiple parity nodes.

At 850, the receiving device 805-*b* may generate the LDPC code according to the base graph comprising the multiple variable nodes and the multiple check nodes. The first set of information nodes of the multiple variable nodes may include second degree nodes corresponding to two check nodes of the plurality of check nodes.

At 855, the receiving device 805-*b* may decode the multiple information bits based on the multiple parity bits, the multiple information nodes, and the multiple parity nodes, the multiple information nodes and the multiple parity nodes corresponding to the base graph, In some examples, the first set of information nodes of the multiple variable nodes may include second degree nodes corresponding to two check nodes of the multiple check nodes. The first quantity of the first set of information nodes may correspond to the first significance level of the multiple significance levels, and the second quantity of the first set of information nodes different than the first quantity corresponds to the second significance level of the plurality of significance levels.

Figure 9:
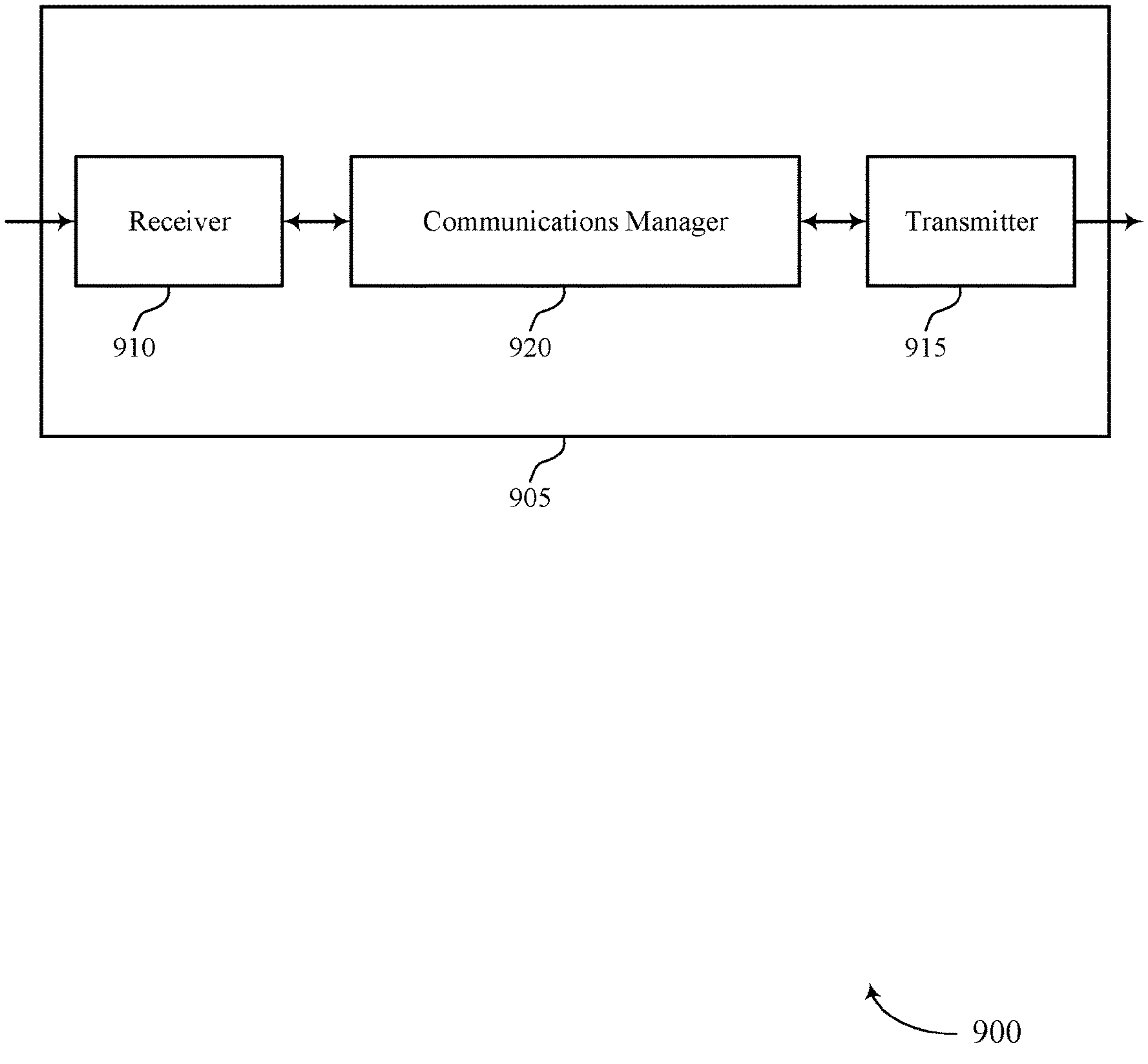
FIGS. 9 and 10 show block diagrams of devices that support joint LDPC coding and modulation designs in accordance with one or more aspects of the present disclosure.

FIG. 9 shows a block diagram 900 of a device 905 that supports joint LDPC and modulation designs in accordance with one or more aspects of the present disclosure. The device 905 may be an example of aspects of a UE 115 or a network entity 105 as described herein. The device 905 may include a receiver 910, a transmitter 915, and a communications manager 920. The device 905, or one or more components of the device 905 (e.g., the receiver 910, the transmitter 915, and the communications manager 920), may include at least one processor (not shown), which may be coupled with at least one memory (not shown), to, individually or collectively, support or enable the described techniques. Each of these components may be in communication with one another (e.g., via one or more buses).

The receiver 910 may provide a means for receiving information such as packets, user data, control information, or any combination thereof associated with various information channels (e.g., control channels, data channels, information channels related to joint LDPC coding and modulation designs). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to joint LDPC check coding and modulation designs). In some examples, the transmitter 915 may be co-located with a receiver 910 in a transceiver module. The transmitter 915 may utilize a single antenna (not shown) or a set of multiple antennas.

The communications manager 920, the receiver 910, the transmitter 915, or various combinations thereof or various components thereof may be examples of means for performing various aspects of joint LDPC coding and modulation designs as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software or firmware) executed by at least one processor. If implemented in code executed by at least one processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a transmitting device in accordance with examples as disclosed herein. For example, the communications manager 920 is capable of, configured to, or operable to support a means for generating a LDPC code according to a base graph including a set of multiple variable nodes and a set of multiple check nodes, where a first set of information nodes of the set of multiple variable nodes include second degree nodes corresponding to two check nodes of the set of multiple check nodes. The communications manager 920 is capable of, configured to, or operable to support a means for encoding a set of multiple information nodes and a set of multiple parity nodes according to the base graph, where a first quantity of the first set of information nodes corresponds to a first significance level of a set of multiple significance levels, and a second quantity of the first set of information nodes different than the first quantity corresponds to a second significance level of the set of multiple significance levels. The communications manager 920 is capable of, configured to, or operable to support a means for transmitting a signal including a set of multiple information bits and a set of multiple parity bits based on the encoding the set of multiple information nodes and the set of multiple parity nodes.

Additionally, or alternatively, the communications manager 920 may support wireless communications at a receiving device in accordance with examples as disclosed herein. For example, the communications manager 920 is capable of, configured to, or operable to support a means for receiving a signal including a set of multiple information bits and a set of multiple parity bits corresponding to a LDPC code. The communications manager 920 is capable of, configured to, or operable to support a means for generating the LDPC code according to a base graph including a set of multiple variable nodes and a set of multiple check nodes, where a first set of information nodes of the set of multiple variable nodes include second degree nodes corresponding to two check nodes of the set of multiple check nodes. The communications manager 920 is capable of, configured to, or operable to support a means for decoding the set of multiple information bits based on the set of multiple parity bits, a set of multiple information nodes, and a set of multiple parity nodes, the set of multiple information nodes and the set of multiple parity nodes corresponding to base graph, where the first set of information nodes of the set of multiple variable nodes include second degree nodes corresponding to two check nodes of the set of multiple check nodes; and where a first quantity of the first set of information nodes corresponds to a first significance level of a set of multiple significance levels, and a second quantity of the first set of information nodes different than the first quantity corresponds to a second significance level of the set of multiple significance levels.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for reduced processing complexity and reduced power consumption.

Figure 10:
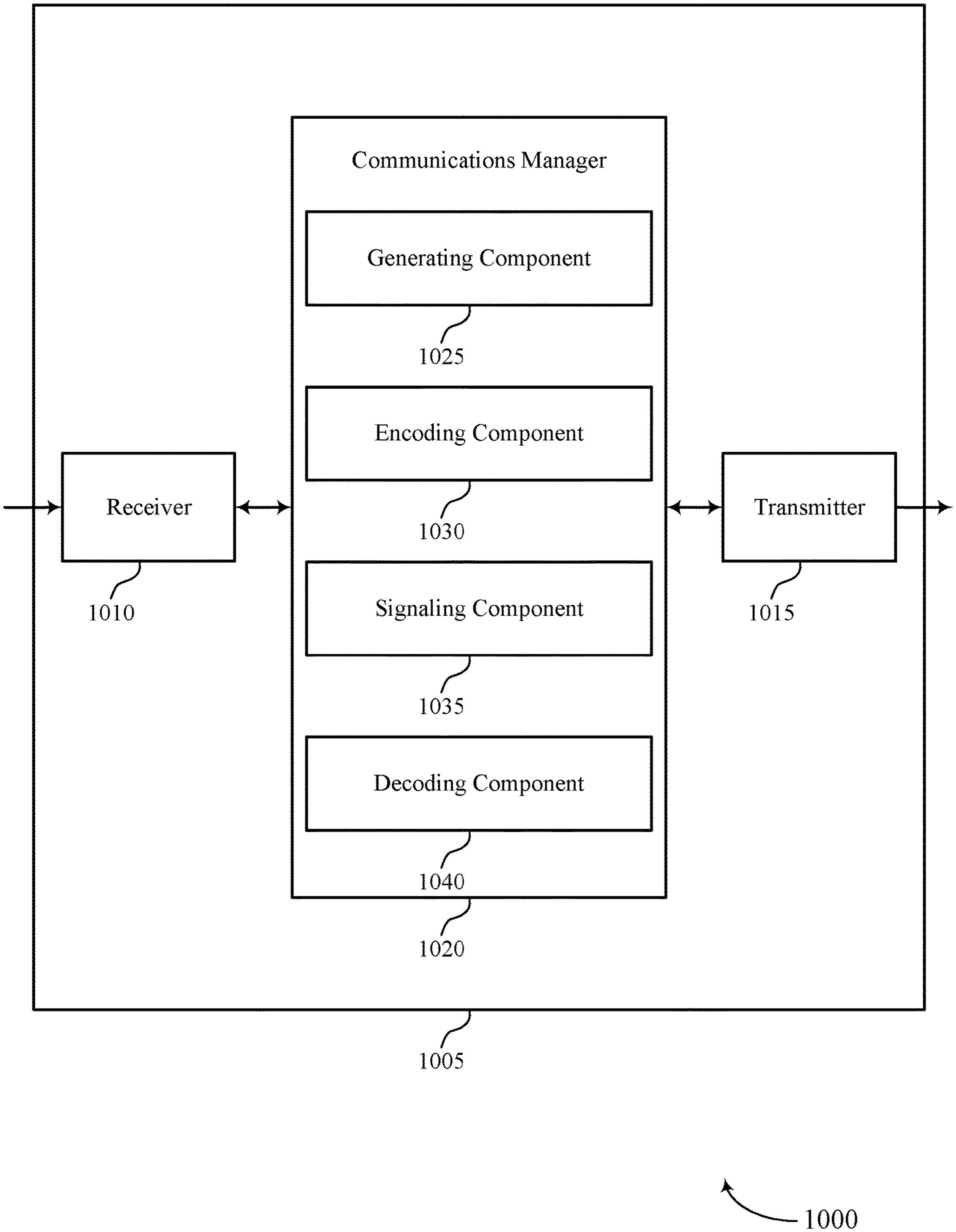

FIG. 10 shows a block diagram 1000 of a device 1005 that supports joint LDPC coding and modulation designs in accordance with one or more aspects of the present disclosure. The device 1005 may be an example of aspects of a device 905, a UE 115, or a network entity 105 as described herein. The device 1005 may include a receiver 1010, a transmitter 1015, and a communications manager 1020. The device 1005, or one of more components of the device 1005 (e.g., the receiver 1010, the transmitter 1015, and the communications manager 1020), may include at least one processor (not shown), which may be coupled with at least one memory (not shown), to support the described techniques. Each of these components may be in communication with one another (e.g., via one or more buses).

The receiver 1010 may provide a means for receiving information such as packets, user data, control information, or any combination thereof associated with various information channels (e.g., control channels, data channels, information channels related to joint LDPC coding and modulation designs). Information may be passed on to other components of the device 1005. The receiver 1010 may utilize a single antenna (not shown) or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to joint LDPC coding and modulation designs). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of joint LDPC coding and modulation designs as described herein. For example, the communications manager 1020 may include a generating component 1025, an encoding component 1030, a signaling component 1035, a decoding component 1040, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a transmitting device in accordance with examples as disclosed herein. The generating component 1025 is capable of, configured to, or operable to support a means for generating a LDPC code according to a base graph including a set of multiple variable nodes and a set of multiple check nodes, where a first set of information nodes of the set of multiple variable nodes include second degree nodes corresponding to two check nodes of the set of multiple check nodes. The encoding component 1030 is capable of, configured to, or operable to support a means for encoding a set of multiple information nodes and a set of multiple parity nodes according to the base graph, where a first quantity of the first set of information nodes corresponds to a first significance level of a set of multiple significance levels, and a second quantity of the first set of information nodes different than the first quantity corresponds to a second significance level of the set of multiple significance levels. The signaling component 1035 is capable of, configured to, or operable to support a means for transmitting a signal including a set of multiple information bits and a set of multiple parity bits based on the encoding the set of multiple information nodes and the set of multiple parity nodes.

Additionally, or alternatively, the communications manager 1020 may support wireless communications at a receiving device in accordance with examples as disclosed herein. The signaling component 1035 is capable of, configured to, or operable to support a means for receiving a signal including a set of multiple information bits and a set of multiple parity bits corresponding to a LDPC code. The generating component 1025 is capable of, configured to, or operable to support a means for generating the LDPC code according to a base graph including a set of multiple variable nodes and a set of multiple check nodes, where a first set of information nodes of the set of multiple variable nodes include second degree nodes corresponding to two check nodes of the set of multiple check nodes. The decoding component 1040 is capable of, configured to, or operable to support a means for decoding the set of multiple information bits based on the set of multiple parity bits, a set of multiple information nodes, and a set of multiple parity nodes, the set of multiple information nodes and the set of multiple parity nodes corresponding to base graph, where the first set of information nodes of the set of multiple variable nodes include second degree nodes corresponding to two check nodes of the set of multiple check nodes; and where a first quantity of the first set of information nodes corresponds to a first significance level of a set of multiple significance levels, and a second quantity of the first set of information nodes different than the first quantity corresponds to a second significance level of the set of multiple significance levels.

Figure 11:
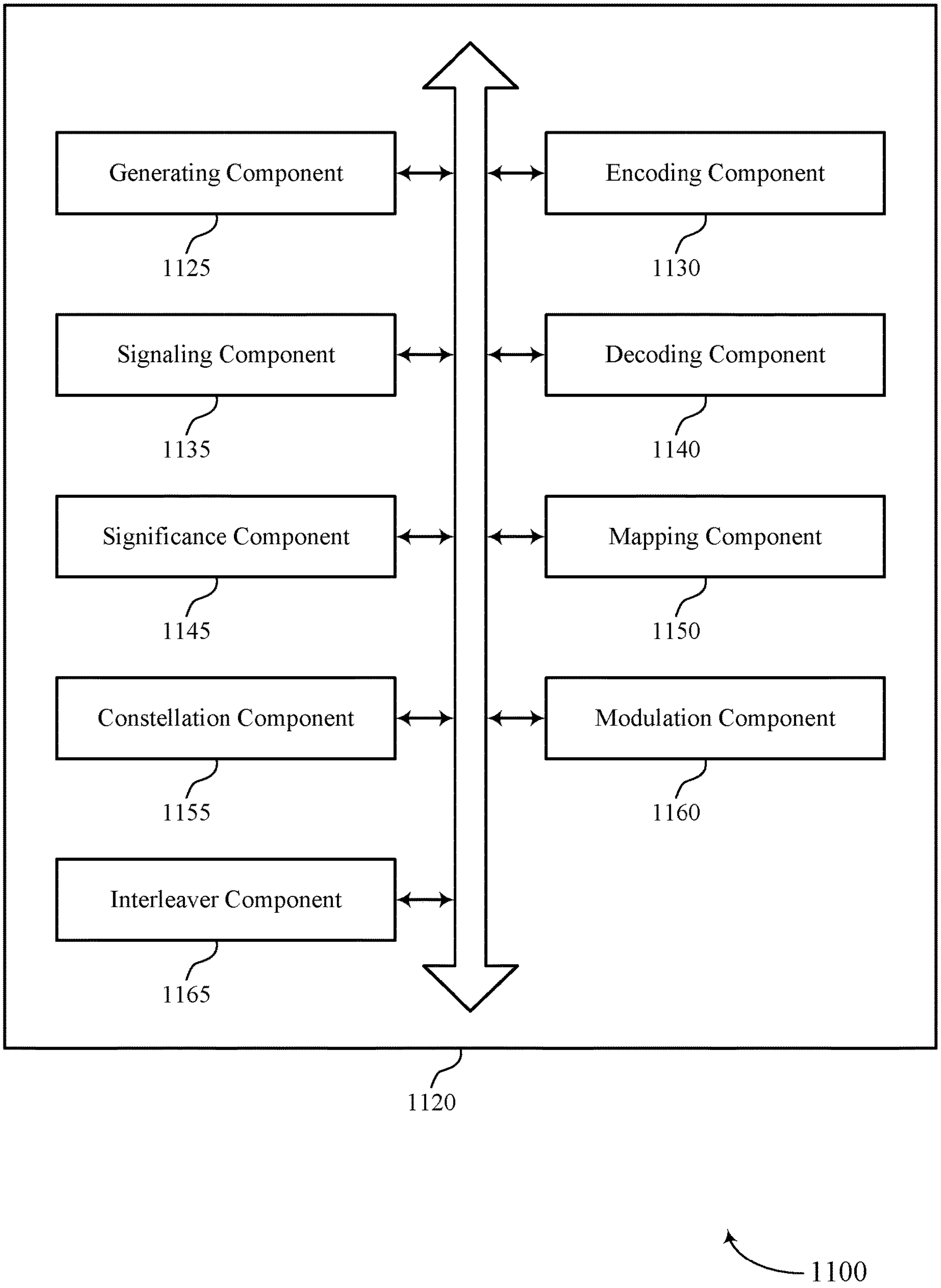
FIG. 11 shows a block diagram of a communications manager that supports joint LDPC coding and modulation designs in accordance with one or more aspects of the present disclosure.

FIG. 11 shows a block diagram 1100 of a communications manager 1120 that supports joint LDPC coding and modulation designs in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of joint LDPC coding and modulation designs as described herein. For example, the communications manager 1120 may include a generating component 1125, an encoding component 1130, a signaling component 1135, a decoding component 1140, a significance component 1145, a mapping component 1150, a constellation component 1155, a modulation component 1160, an interleaver component 1165, or any combination thereof. Each of these components, or components or subcomponents thereof (e.g., one or more processors (not shown), one or more memories (not shown)), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications at a transmitting device in accordance with examples as disclosed herein. The generating component 1125 is capable of, configured to, or operable to support a means for generating a LDPC code according to a base graph including a set of multiple variable nodes and a set of multiple check nodes, where a first set of information nodes of the set of multiple variable nodes include second degree nodes corresponding to two check nodes of the set of multiple check nodes. The encoding component 1130 is capable of, configured to, or operable to support a means for encoding a set of multiple information nodes and a set of multiple parity nodes according to the base graph, where a first quantity of the first set of information nodes corresponds to a first significance level of a set of multiple significance levels, and a second quantity of the first set of information nodes different than the first quantity corresponds to a second significance level of the set of multiple significance levels. The signaling component 1135 is capable of, configured to, or operable to support a means for transmitting a signal including a set of multiple information bits and a set of multiple parity bits based on the encoding the set of multiple information nodes and the set of multiple parity nodes.

In some examples, a set of multiple parity nodes of the base graph include second degree nodes corresponding to two check nodes of the set of multiple check nodes, the set of multiple parity nodes corresponding to a third significance level of the set of multiple significance levels that is higher than the first significance level and the second significance level.

In some examples, each significance level of the set of multiple significance levels corresponds to a respective channel reliability, where a higher significance level corresponds to a higher channel reliability.

In some examples, the first quantity of the first set of information nodes is greater than the second quantity of the first set of information nodes, and where the first significance level is greater than the second significance level.

In some examples, the mapping component 1150 is capable of, configured to, or operable to support a means for mapping the set of multiple information nodes to a set of multiple bits according to an interleaver indicating an inverse relationship between a degree and a significance level of each respective information node of the set of multiple information nodes.

In some examples, the mapping component 1150 is capable of, configured to, or operable to support a means for mapping the set of multiple information nodes to a set of multiple bits according to an interleaver and based on the base graph, where for each information node of the set of multiple information nodes, a numerical value representing a degree of the information node is less than or equal to a respective numerical value representing a significance level corresponding to each information node.

In some examples, a set of multiple parity nodes of the base graph include second degree nodes corresponding to two check nodes of the set of multiple check nodes, the set of multiple parity nodes corresponding to a third significance level of the set of multiple significance levels that is higher than the first significance level and the second significance level.

In some examples, the constellation component 1155 is capable of, configured to, or operable to support a means for selecting a uniform modulation constellation or a probabilistic shaping modulation constellation, where the base graph and generating the LDPC code are based on the selecting.

In some examples, the base graph includes a universal base graph applicable to any constellation of a set of multiple constellations including a uniform modulation constellation and a probabilistic shaping modulation constellation.

In some examples, a second set of information nodes of the set of multiple variable nodes corresponding to a third significance level of the set of multiple significance levels that is lower than the first significance level and the second significance level include third degree nodes corresponding to three check nodes of the set of multiple check nodes.

In some examples, the modulation component 1160 is capable of, configured to, or operable to support a means for receiving control signaling indicating a modulation order, where generating the base graph is based on the modulation order satisfying a modulation order threshold.

In some examples, the interleaver component 1165 is capable of, configured to, or operable to support a means for receiving control signaling indicating an interleaver for bit-to-constellation mapping of the set of multiple information nodes according to the base graph, where generating the LDPC code is based on the control signaling indicating the interleave.

In some examples, the interleaver component 1165 is capable of, configured to, or operable to support a means for receiving an indication of the interleaver via downlink control information, a medium access control-control element, radio resource control signaling, or any combination thereof.

In some examples, the interleaver component 1165 is capable of, configured to, or operable to support a means for selecting an interleaver for bit-to-constellation mapping of the set of multiple information nodes according to the base graph based on an error floor, a threshold sensitivity level, a modulation order, a capability of the transmitting device, a capability of a receiving device, or any combination thereof, where generating the LDPC code is based on the selecting.

In some examples, the interleaver component 1165 is capable of, configured to, or operable to support a means for transmitting an indication of one or more interleavers for bit-to-constellation mapping of the set of multiple information nodes supported by the transmitting device, where generating the LDPC code is based on transmitting the indication of the one or more interleavers.

Additionally, or alternatively, the communications manager 1120 may support wireless communications at a receiving device in accordance with examples as disclosed herein. In some examples, the signaling component 1135 is capable of, configured to, or operable to support a means for receiving a signal including a set of multiple information bits and a set of multiple parity bits corresponding to a LDPC code. In some examples, the generating component 1125 is capable of, configured to, or operable to support a means for generating the LDPC code according to a base graph including a set of multiple variable nodes and a set of multiple check nodes, where a first set of information nodes of the set of multiple variable nodes include second degree nodes corresponding to two check nodes of the set of multiple check nodes. The decoding component 1140 is capable of, configured to, or operable to support a means for decoding the set of multiple information bits based on the set of multiple parity bits, a set of multiple information nodes, and a set of multiple parity nodes, the set of multiple information nodes and the set of multiple parity nodes corresponding to base graph, where the first set of information nodes of the set of multiple variable nodes include second degree nodes corresponding to two check nodes of the set of multiple check nodes; and where a first quantity of the first set of information nodes corresponds to a first significance level of a set of multiple significance levels, and a second quantity of the first set of information nodes different than the first quantity corresponds to a second significance level of the set of multiple significance levels.

In some examples, a set of multiple parity nodes of the base graph include second degree nodes corresponding to two check nodes of the set of multiple check nodes, the set of multiple parity nodes corresponding to a third significance level of the set of multiple significance levels that is higher than the first significance level and the second significance level.

In some examples, the first quantity of the first set of information nodes is greater than the second quantity of the first set of information nodes, and where the first significance level is greater than the second significance level.

In some examples, each significance level of the set of multiple significance levels corresponds to a respective channel reliability, where a higher significance level corresponds to a higher channel reliability.

In some examples, a second set of information nodes of the set of multiple variable nodes corresponding to a third significance level of the set of multiple significance level that is lower than the first significance level and the second significance level include third degree nodes corresponding to three check nodes of the set of multiple check nodes.

In some examples, the modulation component 1160 is capable of, configured to, or operable to support a means for transmitting control signaling indicating a modulation order, where generating the base graph is based on the modulation order satisfying a modulation order threshold.

In some examples, the interleaver component 1165 is capable of, configured to, or operable to support a means for transmitting control signaling indicating an interleaver for bit-to-constellation mapping of the set of multiple information nodes according to the base graph, where generating the LDPC code is based on the control signaling indicating the interleaver.

In some examples, the interleaver component 1165 is capable of, configured to, or operable to support a means for transmitting an indication of the interleaver via downlink control information, a medium access control-control element, radio resource control signaling, or any combination thereof.

In some examples, the interleaver component 1165 is capable of, configured to, or operable to support a means for receiving an indication of one or more interleavers for bit-to-constellation mapping of the set of multiple information nodes supported by a transmitting device, where generating the LDPC code is based on transmitting the indication of the one or more interleavers.

Figure 12:
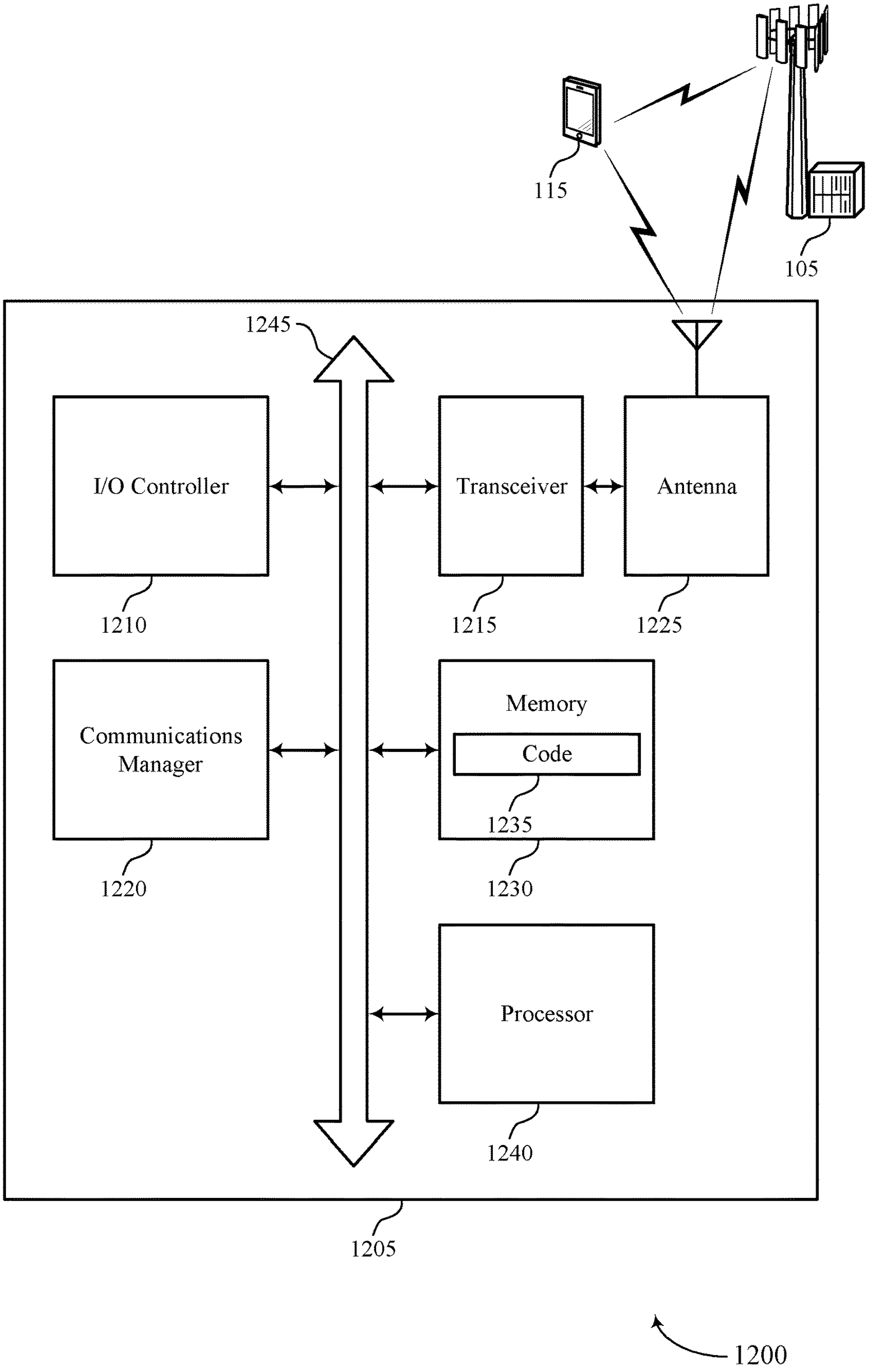
FIG. 12 shows a diagram of a system including a UE that supports joint LDPC coding and modulation designs in accordance with one or more aspects of the present disclosure.

FIG. 12 shows a diagram of a system 1200 including a device 1205 that supports joint LDPC coding and modulation designs in accordance with one or more aspects of the present disclosure. The device 1205 may be an example of or include the components of a device 905, a device 1005, or a UE 115 as described herein. The device 1205 may communicate (e.g., wirelessly) with one or more network entities 105, one or more UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, at least one memory 1230, code 1235, and at least one processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of one or more processors, such as the at least one processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The at least one memory 1230 may include random access memory (RAM) and read-only memory (ROM). The at least one memory 1230 may store computer-readable, computer-executable code 1235 including instructions that, when executed by the at least one processor 1240, cause the device 1205 to perform various functions described herein. The code 1235 may be stored in a non-transitory computer-readable medium such as system memory or another type of memory. In some cases, the code 1235 may not be directly executable by the at least one processor 1240 but may cause a computer (e.g., when compiled and executed) to perform functions described herein. In some cases, the at least one memory 1230 may contain, among other things, a basic I/O system (BIOS) which may control basic hardware or software operation such as the interaction with peripheral components or devices.

The at least one processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1240 may be configured to operate a memory array using a memory controller. In some other cases, a memory controller may be integrated into the at least one processor 1240. The at least one processor 1240 may be configured to execute computer-readable instructions stored in a memory (e.g., the at least one memory 1230) to cause the device 1205 to perform various functions (e.g., functions or tasks supporting joint LDPC coding and modulation designs). For example, the device 1205 or a component of the device 1205 may include at least one processor 1240 and at least one memory 1230 coupled with or to the at least one processor 1240, the at least one processor 1240 and at least one memory 1230 configured to perform various functions described herein. In some examples, the at least one processor 1240 may include multiple processors and the at least one memory 1230 may include multiple memories. One or more of the multiple processors may be coupled with one or more of the multiple memories, which may, individually or collectively, be configured to perform various functions herein.

The communications manager 1220 may support wireless communications at a transmitting device in accordance with examples as disclosed herein. For example, the communications manager 1220 is capable of, configured to, or operable to support a means for generating a LDPC code according to a base graph including a set of multiple variable nodes and a set of multiple check nodes, where a first set of information nodes of the set of multiple variable nodes include second degree nodes corresponding to two check nodes of the set of multiple check nodes. The communications manager 1220 is capable of, configured to, or operable to support a means for encoding a set of multiple information nodes and a set of multiple parity nodes according to the base graph, where a first quantity of the first set of information nodes corresponds to a first significance level of a set of multiple significance levels, and a second quantity of the first set of information nodes different than the first quantity corresponds to a second significance level of the set of multiple significance levels. The communications manager 1220 is capable of, configured to, or operable to support a means for transmitting a signal including a set of multiple information bits and a set of multiple parity bits based on the encoding the set of multiple information nodes and the set of multiple parity nodes.

Additionally, or alternatively, the communications manager 1220 may support wireless communications at a receiving device in accordance with examples as disclosed herein. For example, the communications manager 1220 is capable of, configured to, or operable to support a means for receiving a signal including a set of multiple information bits and a set of multiple parity bits corresponding to a LDPC code. The communications manager 1220 is capable of, configured to, or operable to support a means for generating the LDPC code according to a base graph including a set of multiple variable nodes and a set of multiple check nodes, where a first set of information nodes of the set of multiple variable nodes include second degree nodes corresponding to two check nodes of the set of multiple check nodes. The communications manager 1220 is capable of, configured to, or operable to support a means for decoding the set of multiple information bits based on the set of multiple parity bits, a set of multiple information nodes, and a set of multiple parity nodes, the set of multiple information nodes and the set of multiple parity nodes corresponding to base graph, where the first set of information nodes of the set of multiple variable nodes include second degree nodes corresponding to two check nodes of the set of multiple check nodes; and where a first quantity of the first set of information nodes corresponds to a first significance level of a set of multiple significance levels, and a second quantity of the first set of information nodes different than the first quantity corresponds to a second significance level of the set of multiple significance levels.

By including or configuring the communications manager 1220 in accordance with examples as described herein, the device 1205 may support techniques for reduced processing complexity, improved communication stability and performance, and reduced power consumption.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the at least one processor 1240, the at least one memory 1230, the code 1235, or any combination thereof. For example, the code 1235 may include instructions executable by the at least one processor 1240 to cause the device 1205 to perform various aspects of joint LDPC coding and modulation designs as described herein, or the at least one processor 1240 and the at least one memory 1230 may be otherwise configured to, individually or collectively, perform or support such operations.

Figure 13:
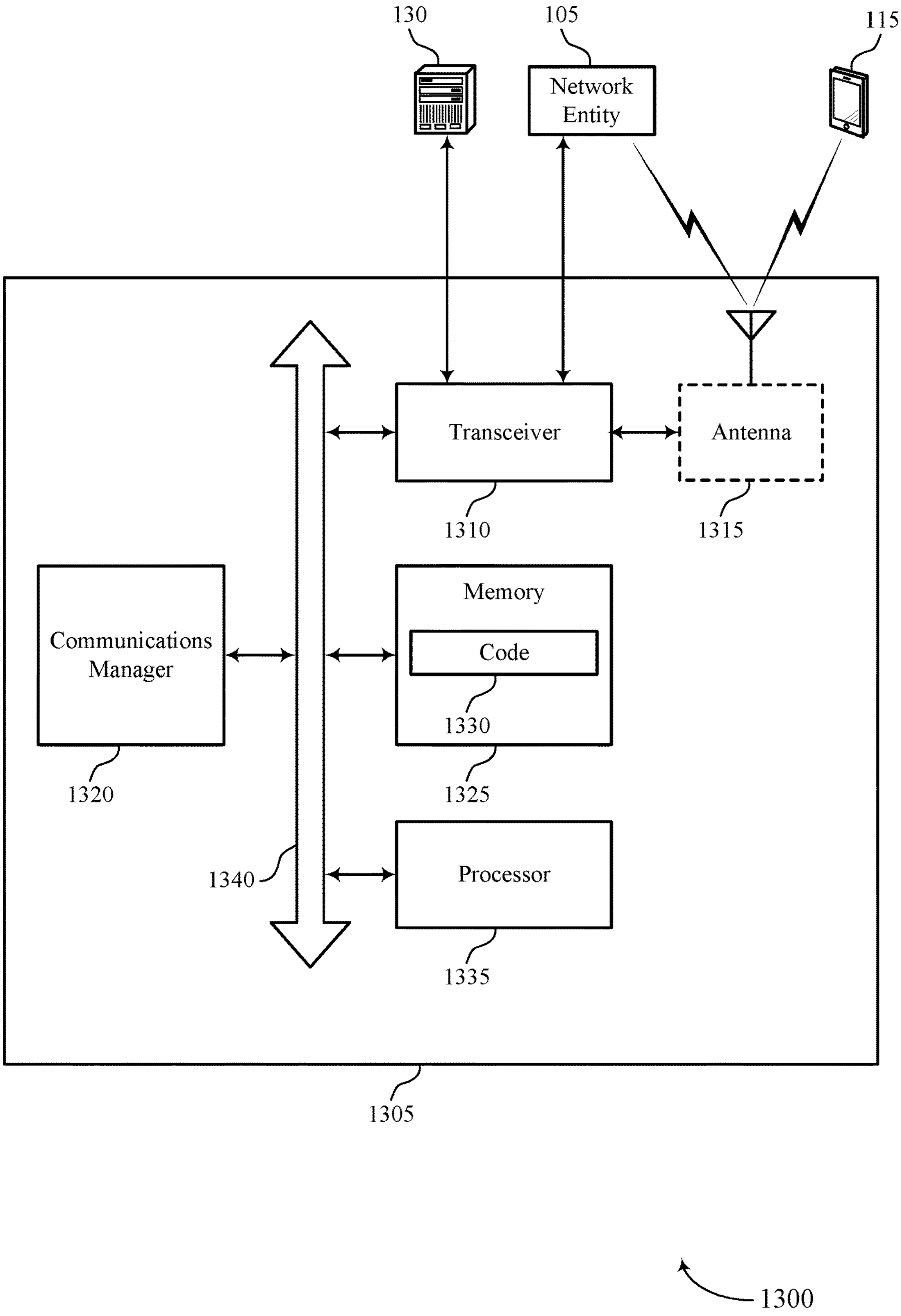
FIG. 13 shows a diagram of a system including a network entity that supports joint LDPC coding and modulation designs in accordance with one or more aspects of the present disclosure.

FIG. 13 shows a diagram of a system 1300 including a device 1305 that supports joint LDPC coding and modulation designs in accordance with one or more aspects of the present disclosure. The device 1305 may be an example of or include the components of a device 905, a device 1005, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, at least one memory 1325, code 1330, and at least one processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or one or more memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or one or more memory components (e.g., the at least one processor 1335, the at least one memory 1325, or both), may be included in a chip or chip assembly that is installed in the device 1305. In some examples, the transceiver 1310 may be operable to support communications via one or more communications links (e.g., a communication link 125, a backhaul communication link 120, a midhaul communication link 162, a fronthaul communication link 168).

The at least one memory 1325 may include RAM, ROM, or any combination thereof. The at least one memory 1325 may store computer-readable, computer-executable code 1330 including instructions that, when executed by one or more of the at least one processor 1335, cause the device 1305 to perform various functions described herein. The code 1330 may be stored in a non-transitory computer-readable medium such as system memory or another type of memory. In some cases, the code 1330 may not be directly executable by a processor of the at least one processor 1335 but may cause a computer (e.g., when compiled and executed) to perform functions described herein. In some cases, the at least one memory 1325 may contain, among other things, a BIOS which may control basic hardware or software operation such as the interaction with peripheral components or devices. In some examples, the at least one processor 1335 may include multiple processors and the at least one memory 1325 may include multiple memories. One or more of the multiple processors may be coupled with one or more of the multiple memories which may, individually or collectively, be configured to perform various functions herein (for example, as part of a processing system).

The at least one processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1335 may be configured to operate a memory array using a memory controller. In some other cases, a memory controller may be integrated into one or more of the at least one processor 1335. The at least one processor 1335 may be configured to execute computer-readable instructions stored in a memory (e.g., one or more of the at least one memory 1325) to cause the device 1305 to perform various functions (e.g., functions or tasks supporting joint LDPC coding and modulation designs). For example, the device 1305 or a component of the device 1305 may include at least one processor 1335 and at least one memory 1325 coupled with one or more of the at least one processor 1335, the at least one processor 1335 and the at least one memory 1325 configured to perform various functions described herein. The at least one processor 1335 may be an example of a cloud-computing platform (e.g., one or more physical nodes and supporting software such as operating systems, virtual machines, or container instances) that may host the functions (e.g., by executing code 1330) to perform the functions of the device 1305. The at least one processor 1335 may be any one or more suitable processors capable of executing scripts or instructions of one or more software programs stored in the device 1305 (such as within one or more of the at least one memory 1325). In some implementations, the at least one processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the at least one processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the at least one memory 1325, the code 1330, and the at least one processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications at a transmitting device in accordance with examples as disclosed herein. For example, the communications manager 1320 is capable of, configured to, or operable to support a means for generating a LDPC code according to a base graph including a set of multiple variable nodes and a set of multiple check nodes, where a first set of information nodes of the set of multiple variable nodes include second degree nodes corresponding to two check nodes of the set of multiple check nodes. The communications manager 1320 is capable of, configured to, or operable to support a means for encoding a set of multiple information nodes and a set of multiple parity nodes according to the base graph, where a first quantity of the first set of information nodes corresponds to a first significance level of a set of multiple significance levels, and a second quantity of the first set of information nodes different than the first quantity corresponds to a second significance level of the set of multiple significance levels. The communications manager 1320 is capable of, configured to, or operable to support a means for transmitting a signal including a set of multiple information bits and a set of multiple parity bits based on the encoding the set of multiple information nodes and the set of multiple parity nodes.

Additionally, or alternatively, the communications manager 1320 may support wireless communications at a receiving device in accordance with examples as disclosed herein. For example, the communications manager 1320 is capable of, configured to, or operable to support a means for receiving a signal including a set of multiple information bits and a set of multiple parity bits corresponding to a LDPC code. The communications manager 1320 is capable of, configured to, or operable to support a means for generating the LDPC code according to a base graph including a set of multiple variable nodes and a set of multiple check nodes, where a first set of information nodes of the set of multiple variable nodes include second degree nodes corresponding to two check nodes of the set of multiple check nodes. The communications manager 1320 is capable of, configured to, or operable to support a means for decoding the set of multiple information bits based on the set of multiple parity bits, a set of multiple information nodes, and a set of multiple parity nodes, the set of multiple information nodes and the set of multiple parity nodes corresponding to base graph, where the first set of information nodes of the set of multiple variable nodes include second degree nodes corresponding to two check nodes of the set of multiple check nodes; and where a first quantity of the first set of information nodes corresponds to a first significance level of a set of multiple significance levels, and a second quantity of the first set of information nodes different than the first quantity corresponds to a second significance level of the set of multiple significance levels.

By including or configuring the communications manager 1320 in accordance with examples as described herein, the device 1305 may support techniques for reduced processing complexity, improved communication stability and performance, and reduced power consumption.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, one or more of the at least one processor 1335, one or more of the at least one memory 1325, the code 1330, or any combination thereof (for example, by a processing system including at least a portion of the at least one processor 1335, the at least one memory 1325, the code 1330, or any combination thereof). For example, the code 1330 may include instructions executable by one or more of the at least one processor 1335 to cause the device 1305 to perform various aspects of joint LDPC coding and modulation designs as described herein, or the at least one processor 1335 and the at least one memory 1325 may be otherwise configured to, individually or collectively, perform or support such operations.

Figure 14:
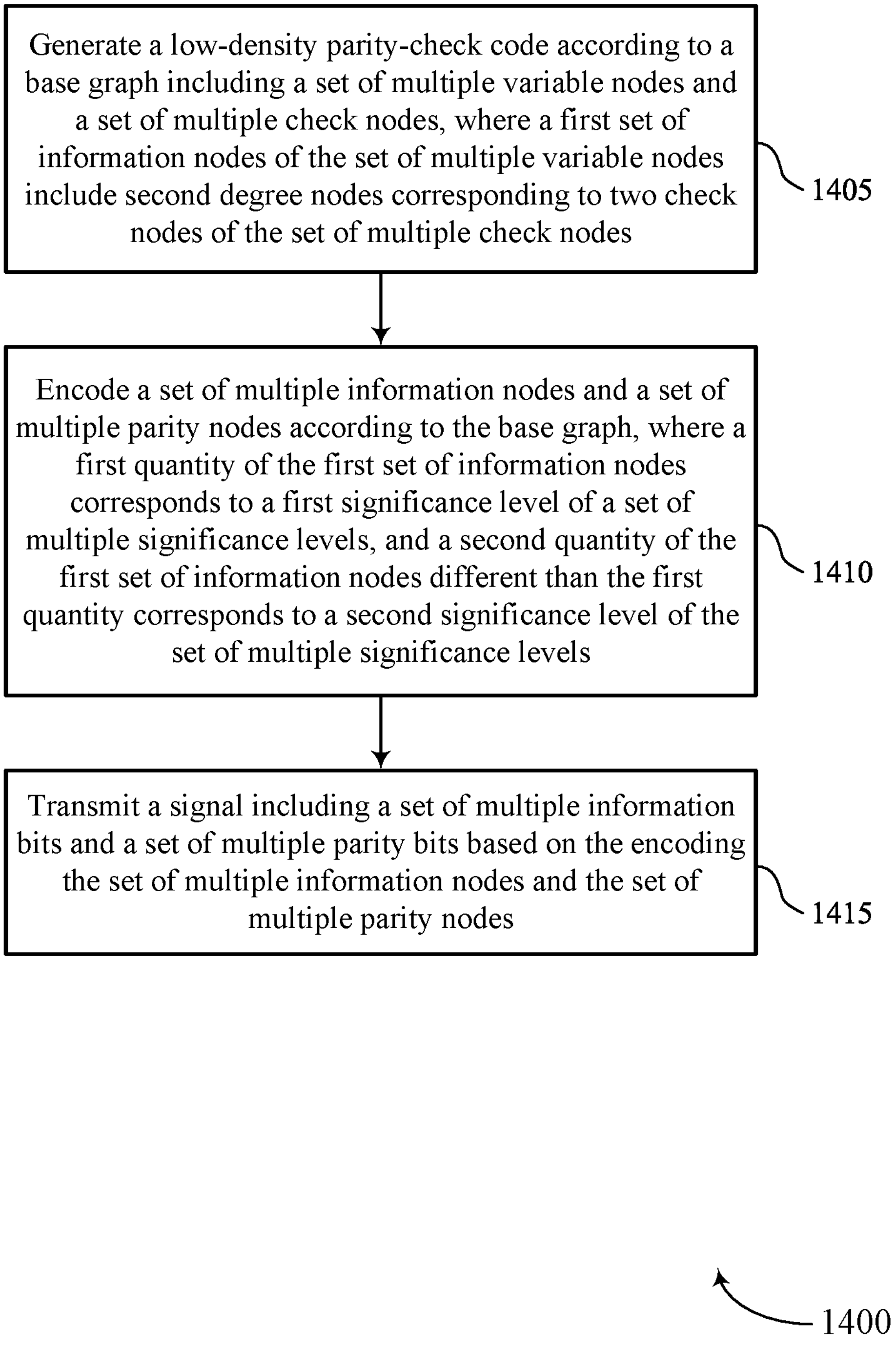
FIGS. 14 through 18 show flowcharts illustrating methods that support joint LDPC coding and modulation designs in accordance with one or more aspects of the present disclosure.

FIG. 14 shows a flowchart illustrating a method 1400 that supports joint LDPC coding and modulation designs in accordance with aspects of the present disclosure. The operations of the method 1400 may be implemented by a UE or a network entity or its components as described herein. For example, the operations of the method 1400 may be performed by a UE 115 or a network entity as described herein with reference to FIGS. 1 through 13. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1405, the method may include generating a LDPC code according to a base graph including a set of multiple variable nodes and a set of multiple check nodes, where a first set of information nodes of the set of multiple variable nodes include second degree nodes corresponding to two check nodes of the set of multiple check nodes. The operations of block 1405 may be performed in accordance with examples as disclosed herein. In some examples, aspects of the operations of 1405 may be performed by a generating component 1125 as described herein with reference to FIG. 11.

At 1410, the method may include encoding a set of multiple information nodes and a set of multiple parity nodes according to the base graph, where a first quantity of the first set of information nodes corresponds to a first significance level of a set of multiple significance levels, and a second quantity of the first set of information nodes different than the first quantity corresponds to a second significance level of the set of multiple significance levels. The operations of block 1410 may be performed in accordance with examples as disclosed herein. In some examples, aspects of the operations of 1410 may be performed by an encoding component 1130 as described herein with reference to FIG. 11.

At 1415, the method may include transmitting a signal including a set of multiple information bits and a set of multiple parity bits based on the encoding the set of multiple information nodes and the set of multiple parity nodes. The operations of block 1415 may be performed in accordance with examples as disclosed herein. In some examples, aspects of the operations of 1415 may be performed by a signaling component 1135 as described herein with reference to FIG. 11.

Figure 15:
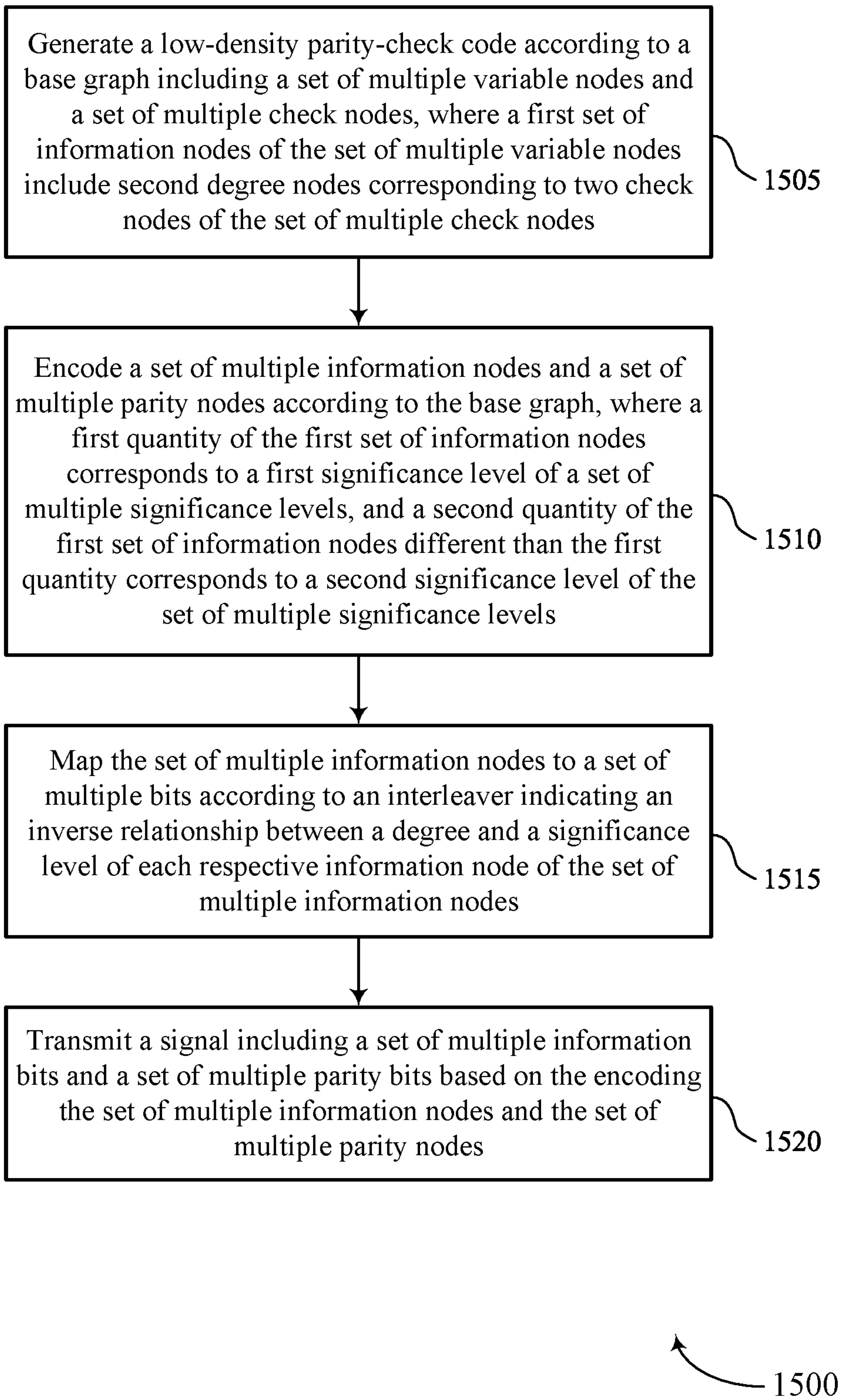

FIG. 15 shows a flowchart illustrating a method 1500 that supports joint LDPC coding and modulation designs in accordance with aspects of the present disclosure. The operations of the method 1500 may be implemented by a UE or a network entity or its components as described herein. For example, the operations of the method 1500 may be performed by a UE 115 or a network entity as described herein with reference to FIGS. 1 through 13. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1505, the method may include generating a LDPC code according to a base graph including a set of multiple variable nodes and a set of multiple check nodes, where a first set of information nodes of the set of multiple variable nodes include second degree nodes corresponding to two check nodes of the set of multiple check nodes. The operations of block 1505 may be performed in accordance with examples as disclosed herein. In some examples, aspects of the operations of 1505 may be performed by a generating component 1125 as described herein with reference to FIG. 11.

At 1510, the method may include encoding a set of multiple information nodes and a set of multiple parity nodes according to the base graph, where a first quantity of the first set of information nodes corresponds to a first significance level of a set of multiple significance levels, and a second quantity of the first set of information nodes different than the first quantity corresponds to a second significance level of the set of multiple significance levels. The operations of block 1510 may be performed in accordance with examples as disclosed herein. In some examples, aspects of the operations of 1510 may be performed by an encoding component 1130 as described herein with reference to FIG. 11.

At 1515, the method may include mapping the set of multiple information nodes to a set of multiple bits according to an interleaver indicating an inverse relationship between a degree and a significance level of each respective information node of the set of multiple information nodes. The operations of block 1515 may be performed in accordance with examples as disclosed herein. In some examples, aspects of the operations of 1515 may be performed by a mapping component 1150 as described herein with reference to FIG. 11.

At 1520, the method may include transmitting a signal including a set of multiple information bits and a set of multiple parity bits based on the encoding the set of multiple information nodes and the set of multiple parity nodes. The operations of block 1520 may be performed in accordance with examples as disclosed herein. In some examples, aspects of the operations of 1520 may be performed by a signaling component 1135 as described herein with reference to FIG. 11.

Figure 16:
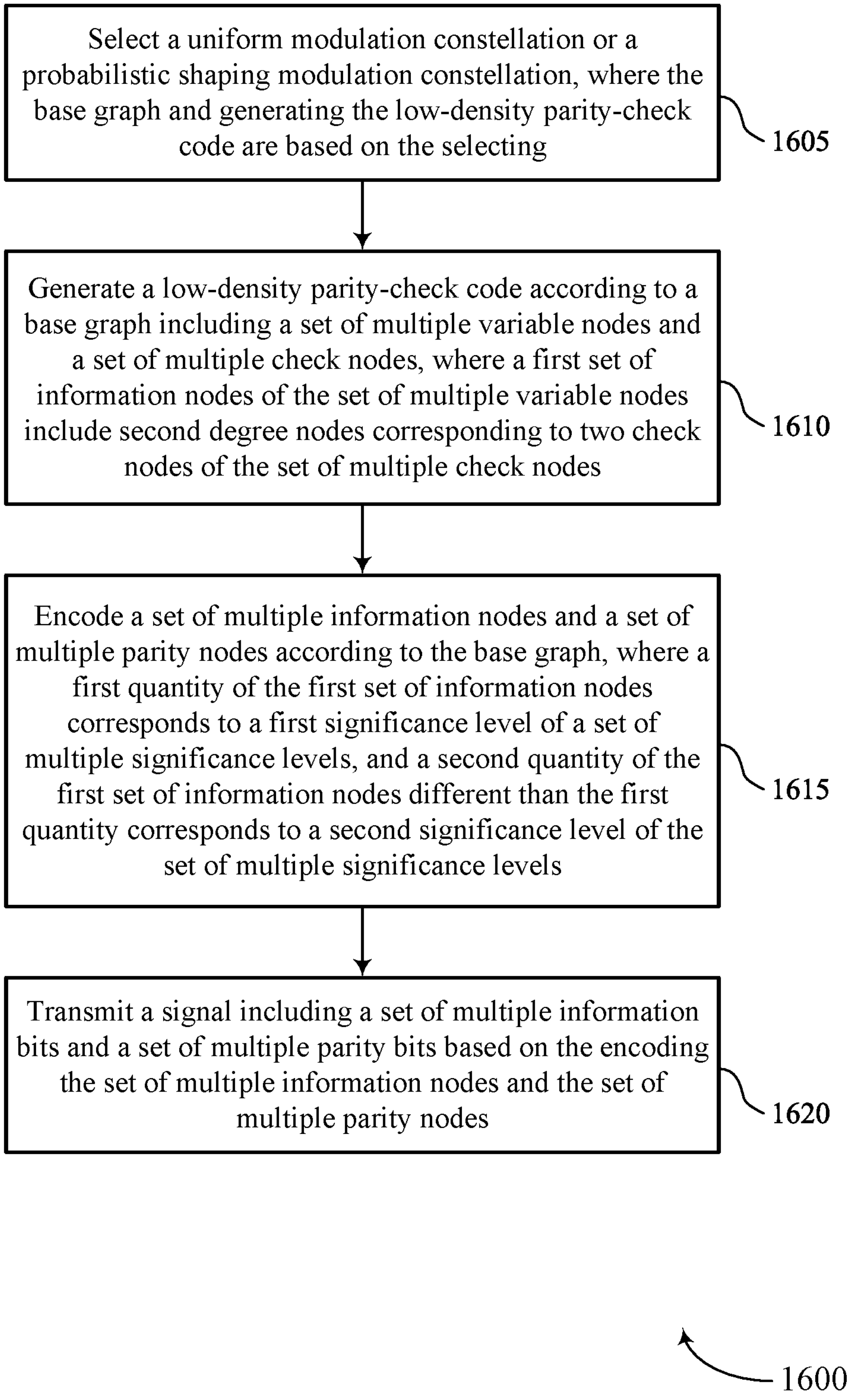

FIG. 16 shows a flowchart illustrating a method 1600 that supports joint LDPC coding and modulation designs in accordance with aspects of the present disclosure. The operations of the method 1600 may be implemented by a UE or a network entity or its components as described herein. For example, the operations of the method 1600 may be performed by a UE 115 or a network entity as described herein with reference to FIGS. 1 through 13. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1605, the method may include selecting a uniform modulation constellation or a probabilistic shaping modulation constellation, where the base graph and generating the LDPC code are based on the selecting. The operations of block 1605 may be performed in accordance with examples as disclosed herein. In some examples, aspects of the operations of 1605 may be performed by a constellation component 1155 described herein with reference to FIG. 11.

At 1610, the method may include generating a LDPC code according to a base graph including a set of multiple variable nodes and a set of multiple check nodes, where a first set of information nodes of the set of multiple variable nodes include second degree nodes corresponding to two check nodes of the set of multiple check nodes. The operations of block 1610 may be performed in accordance with examples as disclosed herein. In some examples, aspects of the operations of 1610 may be performed by a generating component 1125 described herein with reference to FIG. 11.

At 1615, the method may include encoding a set of multiple information nodes and a set of multiple parity nodes according to the base graph, where a first quantity of the first set of information nodes corresponds to a first significance level of a set of multiple significance levels, and a second quantity of the first set of information nodes different than the first quantity corresponds to a second significance level of the set of multiple significance levels. The operations of block 1615 may be performed in accordance with examples as disclosed herein. In some examples, aspects of the operations of 1615 may be performed by an encoding component 1130 described herein with reference to FIG. 11.

At 1620, the method may include transmitting a signal including a set of multiple information bits and a set of multiple parity bits based on the encoding the set of multiple information nodes and the set of multiple parity nodes. The operations of block 1620 may be performed in accordance with examples as disclosed herein. In some examples, aspects of the operations of 1620 may be performed by a signaling component 1135 described herein with reference to FIG. 11.

Figure 17:
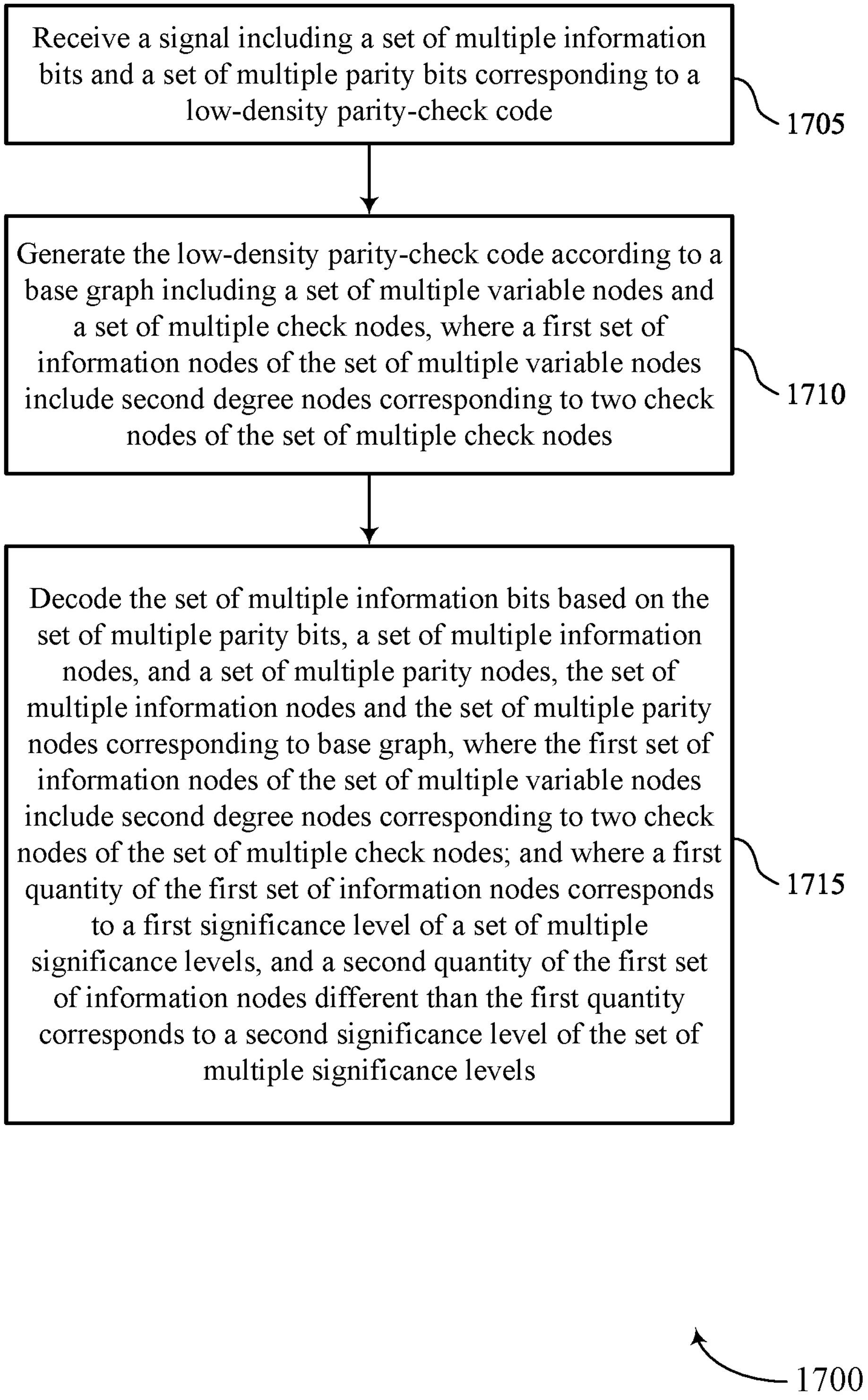

FIG. 17 shows a flowchart illustrating a method 1700 that supports joint LDPC coding and modulation designs in accordance with aspects of the present disclosure. The operations of the method 1700 may be implemented by a UE or a network entity or its components as described herein. For example, the operations of the method 1700 may be performed by a UE 115 or a network entity described herein with reference to FIGS. 1 through 13. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1705, the method may include receiving a signal including a set of multiple information bits and a set of multiple parity bits corresponding to a LDPC code. The operations of block 1705 may be performed in accordance with examples as disclosed herein. In some examples, aspects of the operations of 1705 may be performed by a signaling component 1135 described herein with reference to FIG. 11.

At 1710, the method may include generating the LDPC code according to a base graph including a set of multiple variable nodes and a set of multiple check nodes, where a first set of information nodes of the set of multiple variable nodes include second degree nodes corresponding to two check nodes of the set of multiple check nodes. The operations of block 1710 may be performed in accordance with examples as disclosed herein. In some examples, aspects of the operations of 1710 may be performed by a generating component 1125 described herein with reference to FIG. 11.

At 1715, the method may include decoding the set of multiple information bits based on the set of multiple parity bits, a set of multiple information nodes, and a set of multiple parity nodes, the set of multiple information nodes and the set of multiple parity nodes corresponding to base graph, where the first set of information nodes of the set of multiple variable nodes include second degree nodes corresponding to two check nodes of the set of multiple check nodes; and where a first quantity of the first set of information nodes corresponds to a first significance level of a set of multiple significance levels, and a second quantity of the first set of information nodes different than the first quantity corresponds to a second significance level of the set of multiple significance levels. The operations of block 1715 may be performed in accordance with examples as disclosed herein. In some examples, aspects of the operations of 1715 may be performed by a decoding component 1140 described herein with reference to FIG. 11.

Figure 18:
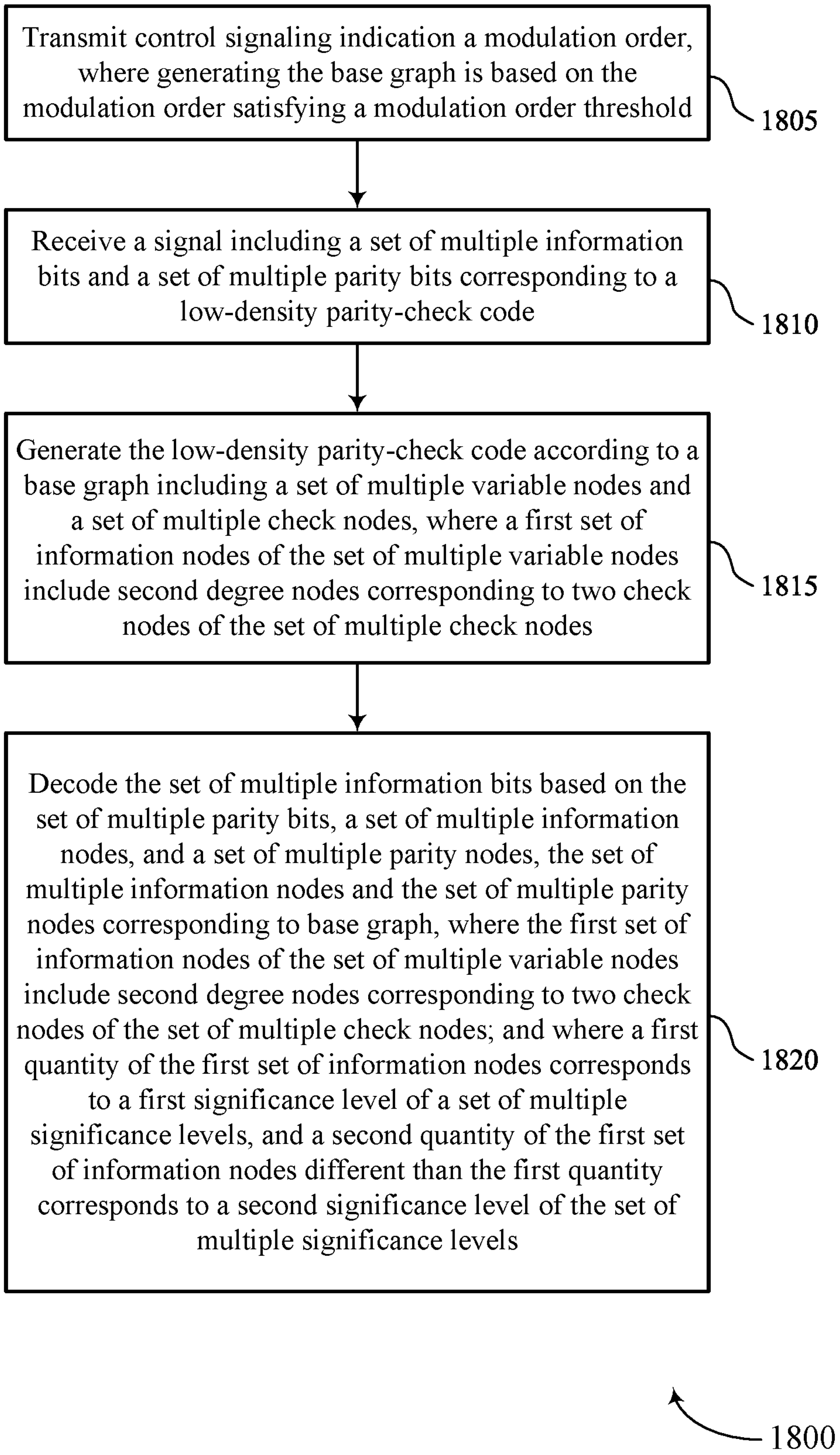

FIG. 18 shows a flowchart illustrating a method 1800 that supports joint LDPC coding and modulation designs in accordance with aspects of the present disclosure. The operations of the method 1800 may be implemented by a UE or a network entity or its components as described herein. For example, the operations of the method 1800 may be performed by a UE 115 or a network entity described herein with reference to FIGS. 1 through 13. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1805, the method may include transmitting control signaling indicating a modulation order, where generating the base graph is based on the modulation order satisfying a modulation order threshold. The operations of block 1805 may be performed in accordance with examples as disclosed herein. In some examples, aspects of the operations of 1805 may be performed by a modulation component 1160 described herein with reference to FIG. 11.

At 1810, the method may include receiving a signal including a set of multiple information bits and a set of multiple parity bits corresponding to a LDPC code. The operations of block 1810 may be performed in accordance with examples as disclosed herein. In some examples, aspects of the operations of 1810 may be performed by a signaling component 1135 described herein with reference to FIG. 11.

At 1815, the method may include generating the LDPC code according to a base graph including a set of multiple variable nodes and a set of multiple check nodes, where a first set of information nodes of the set of multiple variable nodes include second degree nodes corresponding to two check nodes of the set of multiple check nodes. The operations of block 1815 may be performed in accordance with examples as disclosed herein. In some examples, aspects of the operations of 1815 may be performed by a generating component 1125 described herein with reference to FIG. 11.

At 1820, the method may include decoding the set of multiple information bits based on the set of multiple parity bits, a set of multiple information nodes, and a set of multiple parity nodes, the set of multiple information nodes and the set of multiple parity nodes corresponding to base graph, where the first set of information nodes of the set of multiple variable nodes include second degree nodes corresponding to two check nodes of the set of multiple check nodes; and where a first quantity of the first set of information nodes corresponds to a first significance level of a set of multiple significance levels, and a second quantity of the first set of information nodes different than the first quantity corresponds to a second significance level of the set of multiple significance levels. The operations of block 1820 may be performed in accordance with examples as disclosed herein. In some examples, aspects of the operations of 1820 may be performed by a decoding component 1140 described herein with reference to FIG. 11.

The following provides an overview of aspects of the present disclosure:

Aspect 1: A method for wireless communications at a transmitting device, comprising: generating a LDPC code according to a base graph comprising a plurality of variable nodes and a plurality of check nodes, wherein a first set of information nodes of the plurality of variable nodes comprise second degree nodes corresponding to two check nodes of the plurality of check nodes; encoding a plurality of information nodes and a plurality of parity nodes according to the base graph, wherein a first quantity of the first set of information nodes corresponds to a first significance level of a plurality of significance levels, and a second quantity of the first set of information nodes different than the first quantity corresponds to a second significance level of the plurality of significance levels; and transmitting a signal comprising a plurality of information bits and a plurality of parity bits based at least in part on the encoding the plurality of information nodes and the plurality of parity nodes.

Aspect 2: The method of aspect 1, wherein the plurality of parity nodes of the base graph comprise second degree nodes corresponding to two check nodes of the plurality of check nodes, the plurality of parity nodes corresponding to a third significance level of the plurality of significance levels that is higher than the first significance level and the second significance level.

Aspect 3: The method of any of aspects 1 through 2, wherein each significance level of the plurality of significance levels corresponds to a respective channel reliability, where a higher significance level corresponds to a higher channel reliability.

Aspect 4: The method of any of aspects 1 through 3, wherein the first quantity of the first set of information nodes is greater than the second quantity of the first set of information nodes, and wherein the first significance level is greater than the second significance level.

Aspect 5: The method of any of aspects 1 through 4, further comprising: mapping the plurality of information nodes to a plurality of bits according to an interleaver indicating an inverse relationship between a degree and a significance level of each respective information node of the plurality of information nodes.

Aspect 6: The method of any of aspects 1 through 5, further comprising: mapping the plurality of information nodes to a plurality of bits according to an interleaver and based at least in part on the base graph, wherein for each information node of the plurality of information nodes, a numerical value representing a degree of the information node is less than or equal to a respective numerical value representing a significance level corresponding to each information node.

Aspect 7: The method of aspect 6, wherein the plurality of parity nodes of the base graph comprise second degree nodes corresponding to two check nodes of the plurality of check nodes, the plurality of parity nodes corresponding to a third significance level of the plurality of significance levels that is higher than the first significance level and the second significance level.

Aspect 8: The method of any of aspects 1 through 7, further comprising: selecting a uniform modulation constellation or a probabilistic shaping modulation constellation, wherein the base graph and generating the LDPC code are based at least in part on the selecting.

Aspect 9: The method of any of aspects 1 through 8, wherein the base graph comprises a universal base graph applicable to any constellation of a plurality of constellations comprising a uniform modulation constellation and a probabilistic shaping modulation constellation.

Aspect 10: The method of any of aspects 1 through 9, wherein a second set of information nodes of the plurality of variable nodes corresponding to a third significance level of the plurality of significance levels that is lower than the first significance level and the second significance level comprise third degree nodes corresponding to three check nodes of the plurality of check nodes.

Aspect 11: The method of any of aspects 1 through 10, further comprising: receiving control signaling indicating a modulation order, wherein generating the base graph is based at least in part on the modulation order satisfying a modulation order threshold.

Aspect 12: The method of any of aspects 1 through 11, further comprising: receiving control signaling indicating an interleaver for bit-to-constellation mapping of the plurality of information nodes according to the base graph, wherein generating the LDPC code is based at least in part on the control signaling indicating the interleaver.

Aspect 13: The method of aspect 12, further comprising: receiving an indication of the interleaver via DCI, a MAC-CE, RRC signaling, or any combination thereof.

Aspect 14: The method of any of aspects 1 through 13, further comprising: selecting an interleaver for bit-to-constellation mapping of the plurality of information nodes according to the base graph based at least in part on an error floor, a threshold sensitivity level, a modulation order, a capability of the transmitting device, a capability of a receiving device, or any combination thereof, wherein generating the LDPC code is based at least in part on the selecting.

Aspect 15: The method of any of aspects 1 through 14, further comprising: transmitting an indication of one or more interleavers for bit-to-constellation mapping of the plurality of information nodes supported by the transmitting device, wherein generating the LDPC code is based at least in part on transmitting the indication of the one or more interleavers.

Aspect 16: A method for wireless communications at a receiving device, comprising: receiving a signal comprising a plurality of information bits and a plurality of parity bits corresponding to a LDPC code; generating the LDPC code according to a base graph comprising a plurality of variable nodes and a plurality of check nodes, wherein a first set of information nodes of the plurality of variable nodes comprise second degree nodes corresponding to two check nodes of the plurality of check nodes; and decoding the plurality of information bits based at least in part on the plurality of parity bits, a plurality of information nodes, and a plurality of parity nodes, the plurality of information nodes and the plurality of parity nodes corresponding to the base graph, wherein the first set of information nodes of the plurality of variable nodes comprise second degree nodes corresponding to two check nodes of the plurality of check nodes; and wherein a first quantity of the first set of information nodes corresponds to a first significance level of a plurality of significance levels, and a second quantity of the first set of information nodes different than the first quantity corresponds to a second significance level of the plurality of significance levels.

Aspect 17: The method of aspect 16, wherein the plurality of parity nodes of the base graph comprise second degree nodes corresponding to two check nodes of the plurality of check nodes, the plurality of parity nodes corresponding to a third significance level of the plurality of significance levels that is higher than the first significance level and the second significance level.

Aspect 18: The method of any of aspects 16 through 17, wherein the first quantity of the first set of information nodes is greater than the second quantity of the first set of information nodes, and wherein the first significance level is greater than the second significance level.

Aspect 19: The method of aspect 18, wherein each significance level of the plurality of significance levels corresponds to a respective channel reliability, where a higher significance level corresponds to a higher channel reliability.

Aspect 20: The method of any of aspects 16 through 19, wherein a second set of information nodes of the plurality of variable nodes corresponding to a third significance level of the plurality of significance levels that is lower than the first significance level and the second significance level comprise third degree nodes corresponding to three check nodes of the plurality of check nodes.

Aspect 21: The method of any of aspects 16 through 20, further comprising: transmitting control signaling indicating a modulation order, wherein generating the base graph is based at least in part on the modulation order satisfying a modulation order threshold.

Aspect 22: The method of any of aspects 16 through 21, further comprising: transmitting control signaling indicating an interleaver for bit-to-constellation mapping of the plurality of information nodes according to the base graph, wherein generating the LDPC code is based at least in part on the control signaling indicating the interleaver.

Aspect 23: The method of aspect 22, further comprising: transmitting an indication of the interleaver via DCI, a MAC-CE, RRC signaling, or any combination thereof.

Aspect 24: The method of any of aspects 16 through 23, further comprising: receiving an indication of one or more interleavers for bit-to-constellation mapping of the plurality of information nodes supported by a transmitting device, wherein generating the LDPC code is based at least in part on receiving the indication of the one or more interleavers.

Aspect 25: An apparatus for wireless communications at a transmitting device, comprising at least one processor; at least one memory coupled with the at least one processor; and instructions stored in the at least one memory and executable by the at least one processor, individually or in any combination, to cause the apparatus to perform a method of any of aspects 1 through 15.

Aspect 26: An apparatus for wireless communications at a transmitting device, comprising at least one means for performing a method of any of aspects 1 through 15.

Aspect 27: A non-transitory computer-readable medium storing code for wireless communications at a transmitting device, the code comprising instructions executable by a processor to perform a method of any of aspects 1 through 15.

Aspect 28: An apparatus for wireless communications at a receiving device, comprising at least one processor; at least one memory coupled with the at least one processor; and instructions stored in the at least one memory and executable by the at least one processor, individually or in any combination, to cause the apparatus to perform a method of any of aspects 16 through 24.

Aspect 29: An apparatus for wireless communications at a receiving device, comprising at least one means for performing a method of any of aspects 16 through 24.

Aspect 30: A non-transitory computer-readable medium storing code for wireless communications at a receiving device, the code comprising instructions executable by a processor to perform a method of any of aspects 16 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a transmitting device, comprising:

at least one processor; and at least one memory coupled with the at least one processor, the at least one memory storing instructions executable by the at least one processor, individually or in any combination, to cause the apparatus to:

generate, based at least in part on a modulation order satisfying a threshold, a low-density parity-check code according to a base graph comprising a plurality of variable nodes and a plurality of check nodes, wherein a first set of information nodes of the plurality of variable nodes comprise second degree nodes corresponding to two check nodes of the plurality of check nodes;

encode a plurality of information nodes and a plurality of parity nodes according to the base graph, wherein a first quantity of the first set of information nodes corresponds to a first significance level of a plurality of significance levels, and a second quantity of the first set of information nodes less than the first quantity corresponds to a second significance level of the plurality of significance levels, the first significance level greater than the second significance level, and wherein the plurality of parity nodes of the base graph comprise second degree nodes corresponding to two check nodes of the plurality of check nodes, the plurality of parity nodes corresponding to a third significance level of the plurality of significance levels that is higher than the first significance level and the second significance level; and transmit a signal comprising a plurality of information bits and a plurality of parity bits based at least in part on the encoding the plurality of information nodes and the plurality of parity nodes.

2. The apparatus of claim 1, wherein each significance level of the plurality of significance levels corresponds to a respective channel reliability, where a higher significance level corresponds to a higher channel reliability.

3. The apparatus of claim 1, wherein the instructions are further executable by the at least one processor to cause the apparatus to:

map the plurality of information nodes to a plurality of bits according to an interleaver indicating an inverse relationship between a degree and a significance level of each respective information node of the plurality of information nodes.

4. The apparatus of claim 1, wherein the instructions are further executable by the at least one processor to cause the apparatus to:

map the plurality of information nodes to a plurality of bits according to an interleaver and based at least in part on the base graph, wherein for each information node of the plurality of information nodes, a numerical value representing a degree of the information node is less than or equal to a respective numerical value representing a significance level corresponding to each information node.

5. The apparatus of claim 1, wherein the instructions are further executable by the at least one processor to cause the apparatus to:

select a uniform modulation constellation or a probabilistic shaping modulation constellation, wherein the base graph and generating the low-density parity-check code are based at least in part on the selecting.

6. The apparatus of claim 1, wherein the base graph comprises a universal base graph applicable to any constellation of a plurality of constellations comprising a uniform modulation constellation and a probabilistic shaping modulation constellation.

7. The apparatus of claim 1, wherein a second set of information nodes of the plurality of variable nodes corresponding to a fourth significance level of the plurality of significance levels that is lower than the first significance level and the second significance level comprise third degree nodes corresponding to three check nodes of the plurality of check nodes.

8. The apparatus of claim 1, wherein the instructions are further executable by the at least one processor to cause the apparatus to:

receive control signaling indicating the modulation order, wherein generating the base graph is based at least in part on the modulation order satisfying a modulation order threshold.

9. The apparatus of claim 1, wherein the instructions are further executable by the at least one processor to cause the apparatus to:

receive control signaling indicating an interleaver for bit-to-constellation mapping of the plurality of information nodes according to the base graph, wherein generating the low-density parity-check code is based at least in part on the control signaling indicating the interleaver.

10. The apparatus of claim 9, wherein the instructions are further executable by the at least one processor to cause the apparatus to:

receive an indication of the interleaver via downlink control information, a medium access control-control element, radio resource control signaling, or any combination thereof.

11. The apparatus of claim 1, wherein the instructions are further executable by the at least one processor to cause the apparatus to:

select an interleaver for bit-to-constellation mapping of the plurality of information nodes according to the base graph based at least in part on an error floor, a threshold sensitivity level, the modulation order, a capability of the transmitting device, a capability of a receiving device, or any combination thereof, wherein generating the low-density parity-check code is based at least in part on the selecting.

12. The apparatus of claim 1, wherein the instructions are further executable by the at least one processor to cause the apparatus to:

transmit an indication of one or more interleavers for bit-to-constellation mapping of the plurality of information nodes supported by the transmitting device, wherein generating the low-density parity-check code is based at least in part on transmitting the indication of the one or more interleavers.

13. An apparatus for wireless communications at a receiving device, comprising:

at least one processor; and at least one memory coupled with the at least one processor, the at least one memory storing instructions executable by the at least one processor, individually or in any combination, to cause the apparatus to:

receive a signal comprising a plurality of information bits and a plurality of parity bits corresponding to a low-density parity-check code;

generate, based at least in part on a modulation order satisfying a threshold, the low-density parity-check code according to a base graph comprising a plurality of variable nodes and a plurality of check nodes, wherein a first set of information nodes of the plurality of variable nodes comprise second degree nodes corresponding to two check nodes of the plurality of check nodes; and decode the plurality of information bits based at least in part on the plurality of parity bits, a plurality of information nodes, and a plurality of parity nodes, the plurality of information nodes and the plurality of parity nodes corresponding to the base graph, wherein a first quantity of the first set of information nodes corresponds to a first significance level of a plurality of significance levels, and a second quantity of the first set of information nodes less than the first quantity corresponds to a second significance level of the plurality of significance levels, the first significance level greater than the second significance level, and wherein the plurality of parity nodes of the base graph comprise second degree nodes corresponding to two check nodes of the plurality of check nodes, the plurality of parity nodes corresponding to a third significance level of the plurality of significance levels that is higher than the first significance level and the second significance level.

14. The apparatus of claim 13, wherein each significance level of the plurality of significance levels corresponds to a respective channel reliability, where a higher significance level corresponds to a higher channel reliability.

15. The apparatus of claim 13, wherein a second set of information nodes of the plurality of variable nodes corresponding to a fourth significance level of the plurality of significance levels that is lower than the first significance level and the second significance level comprise third degree nodes corresponding to three check nodes of the plurality of check nodes.

16. The apparatus of claim 13, wherein the instructions are further executable by the at least one processor to cause the apparatus to:

transmit control signaling indicating the modulation order, wherein generating the base graph is based at least in part on the modulation order satisfying a modulation order threshold.

17. The apparatus of claim 13, wherein the instructions are further executable by the at least one processor to cause the apparatus to:

transmit control signaling indicating an interleaver for bit-to-constellation mapping of the plurality of information nodes according to the base graph, wherein generating the low-density parity-check code is based at least in part on the control signaling indicating the interleaver.

18. The apparatus of claim 17, wherein the instructions are further executable by the at least one processor to cause the apparatus to:

transmit an indication of the interleaver via downlink control information, a medium access control-control element, radio resource control signaling, or any combination thereof.

19. The apparatus of claim 13, wherein the instructions are further executable by the at least one processor to cause the apparatus to:

receive an indication of one or more interleavers for bit-to-constellation mapping of the plurality of information nodes supported by a transmitting device, wherein generating the low-density parity-check code is based at least in part on receiving the indication of the one or more interleavers.

20. A method for wireless communications at a transmitting device, comprising:

generating, based at least in part on a modulation order satisfying a threshold, a low-density parity-check code according to a base graph comprising a plurality of variable nodes and a plurality of check nodes, wherein a first set of information nodes of the plurality of variable nodes comprise second degree nodes corresponding to two check nodes of the plurality of check nodes;

encoding a plurality of information nodes and a plurality of parity nodes according to the base graph, wherein a first quantity of the first set of information nodes corresponds to a first significance level of a plurality of significance levels, and a second quantity of the first set of information nodes less than the first quantity corresponds to a second significance level of the plurality of significance levels, the first significance level greater than the second significance level, and wherein the plurality of parity nodes of the base graph comprise second degree nodes corresponding to two check nodes of the plurality of check nodes, the plurality of parity nodes corresponding to a third significance level of the plurality of significance levels that is higher than the first significance level and the second significance level; and transmitting a signal comprising a plurality of information bits and a plurality of parity bits based at least in part on the encoding the plurality of information nodes and the plurality of parity nodes.

21. The method of claim 20, wherein each significance level of the plurality of significance levels corresponds to a respective channel reliability, where a higher significance level corresponds to a higher channel reliability.

22. A method for wireless communications at a receiving device, comprising:

receiving a signal comprising a plurality of information bits and a plurality of parity bits corresponding to a low-density parity-check code;

generating, based at least in part on a modulation order satisfying a threshold, the low-density parity-check code according to a base graph comprising a plurality of variable nodes and a plurality of check nodes, wherein a first set of information nodes of the plurality of variable nodes comprise second degree nodes corresponding to two check nodes of the plurality of check nodes; and decoding the plurality of information bits based at least in part on the plurality of parity bits, a plurality of information nodes, and a plurality of parity nodes, the plurality of information nodes and the plurality of parity nodes corresponding to the base graph, wherein a first quantity of the first set of information nodes corresponds to a first significance level of a plurality of significance levels, and a second quantity of the first set of information nodes less than the first quantity corresponds to a second significance level of the plurality of significance levels, the first significance level greater than the second significance level, and wherein the plurality of parity nodes of the base graph comprise second degree nodes corresponding to two check nodes of the plurality of check nodes, the plurality of parity nodes corresponding to a third significance level of the plurality of significance levels that is higher than the first significance level and the second significance level.

* * * * *